(12) United States Patent  
Katagiri et al.

(10) Patent No.: US 7,990,443 B2  
(45) Date of Patent: Aug. 2, 2011

(54) IMAGE SENSING APPARATUS AND IMAGE PROCESSING METHOD

(75) Inventors: Tetsuya Katagiri, Kyoto (JP); Koichi Kamon, Otokuni-gun (JP)

(73) Assignee: Konica Minolta Holdings, Inc., Tokyo (JP)

( * ) Notice: Subject to any disclaimer, the term of this patent is extended or adjusted under 35 U.S.C. 154(b) by 0 days.

(21) Appl. No.: 12/849,460

(22) Filed: Aug. 3, 2010

(65) Prior Publication Data

US 2010/0302405 A1 Dec. 2, 2010

Related U.S. Application Data

(62) Division of application No. 11/502,269, filed on Aug. 10, 2006, now Pat. No. 7,791,656.

(30) Foreign Application Priority Data

| Aug. 16, 2005 | (JP) | 2005-235987 |
| Aug. 16, 2005 | (JP) | 2005-235988 |
| May 10, 2006 | (JP) | 2006-131740 |
| May 10, 2006 | (JP) | 2006-131741 |

(51) Int. Cl.  
*H04N 5/202* (2006.01)

(52) U.S. Cl. .................. 348/254; 348/235; 382/274

(58) Field of Classification Search ................. None  
See application file for complete search history.

(56) References Cited

U.S. PATENT DOCUMENTS

| 5,012,333 A | * | 4/1991 | Lee et al. | 358/520 |
| 6,072,913 A | * | 6/2000 | Yamada | 382/275 |
| 6,130,724 A | | 10/2000 | Hwang | 348/678 |

(Continued)

FOREIGN PATENT DOCUMENTS

JP 05-300376 A 11/1993

(Continued)

OTHER PUBLICATIONS

Japanese Notice of Reasons for Rejection dated Oct. 19, 2010, for counterpart Japanese Application No. 2005-131740, together with an English translation thereof.

*Primary Examiner* — Lin Ye  
*Assistant Examiner* — Dennis Hogue  
(74) *Attorney, Agent, or Firm* — Sidley Austin LLP

(57) ABSTRACT

An image sensing apparatus includes: an image sensing device for sensing light representing a subject image; a first component extractor for extracting a first component having a predetermined frequency out of a photographic image obtained by the image sensing device; a second component extractor for extracting a second component having a frequency higher than the frequency of the first component out of the photographic image; a compressor for compressing a dynamic range of the first component extracted by the first component extractor with a predetermined compression ratio; an image generator for generating an image based on a compressed first component obtained by compressing the dynamic range of the first component by the compressor, and the second component extracted by the second component extractor; and a compression correction coefficient calculator for calculating a compression correction coefficient used in compressing the first component, using the second component extracted by the second component extractor, wherein the compressor determines the compression ratio in such a manner that the larger compression correction coefficient increases the compression ratio based on the compression correction coefficient calculated by the compression correction coefficient calculator, and compresses the dynamic range of the first component based on the determined compression ratio.

2 Claims, 18 Drawing Sheets

U.S. PATENT DOCUMENTS

| | | | |
|---|---|---|---|
| 7,181,086 B2 * | 2/2007 | Gindele et al. | 382/265 |
| 2002/0034336 A1 | 3/2002 | Shiota et al. | 382/274 |
| 2003/0012448 A1 * | 1/2003 | Kimmel et al. | 382/274 |
| 2003/0016855 A1 * | 1/2003 | Shinbata | 382/132 |
| 2003/0052979 A1 | 3/2003 | Soga et al. | 348/241 |
| 2003/0156761 A1 | 8/2003 | Ogata et al. | 382/251 |
| 2005/0135665 A1 * | 6/2005 | Shinbata | 382/132 |
| 2005/0254722 A1 | 11/2005 | Fattal et al. | 382/274 |
| 2006/0204057 A1 | 9/2006 | Steinberg | 382/118 |

FOREIGN PATENT DOCUMENTS

| | | |
|---|---|---|
| JP | 07-128031 A | 5/1995 |
| JP | 08-063597 A | 3/1996 |
| JP | 2000-316090 A | 11/2000 |
| JP | 2001-86402 A | 3/2001 |
| JP | 2002-074356 A | 3/2002 |
| JP | 2003-8935 A | 1/2003 |

* cited by examiner

FIG. 7

| 1 | 2 | 3 | 4 | 5 |
|---|---|---|---|---|
| 6 | A B C D E F | | | 7 |
|   | G H I J K L | | | |
| 8 | M N O P Q R | | | 9 |
|   | S T U V W X | | | |
| 10 | Y Z AA AB AC AD | | | 11 |
|    | AE AF AG AH AI AJ | | | |
| 12 | 13 | 14 | 15 | 16 |

400, 410, 420

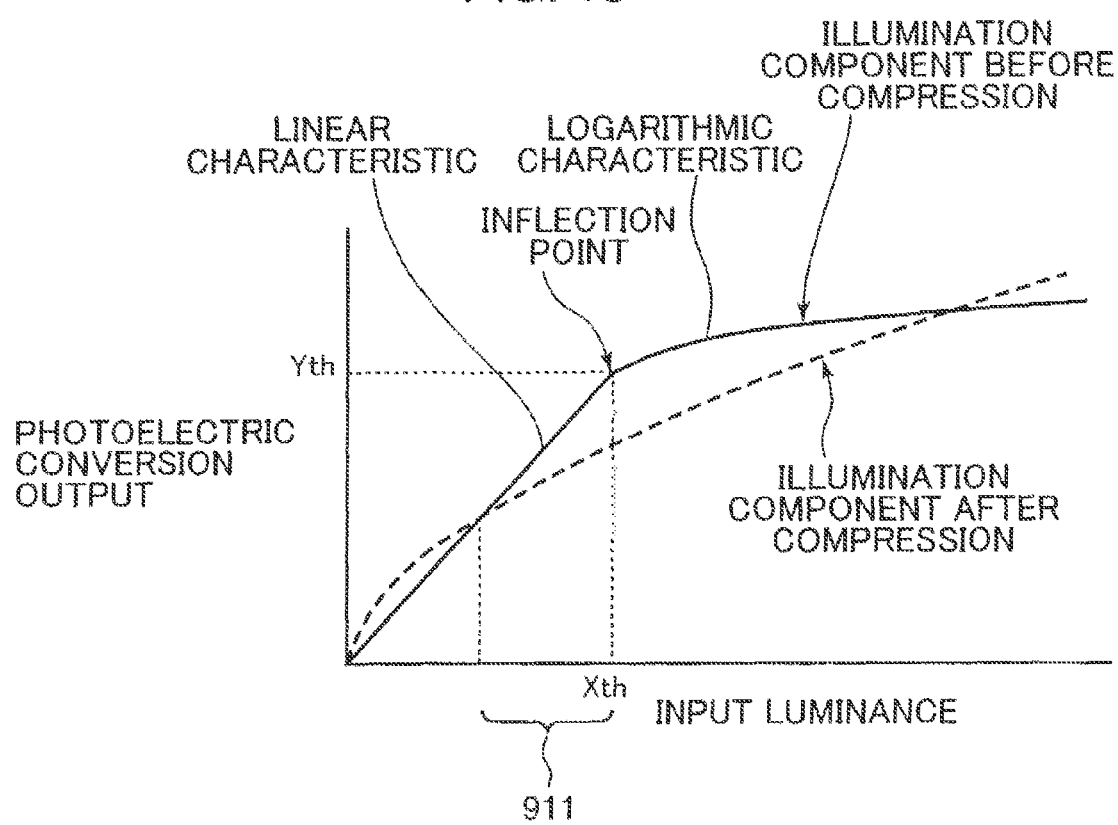

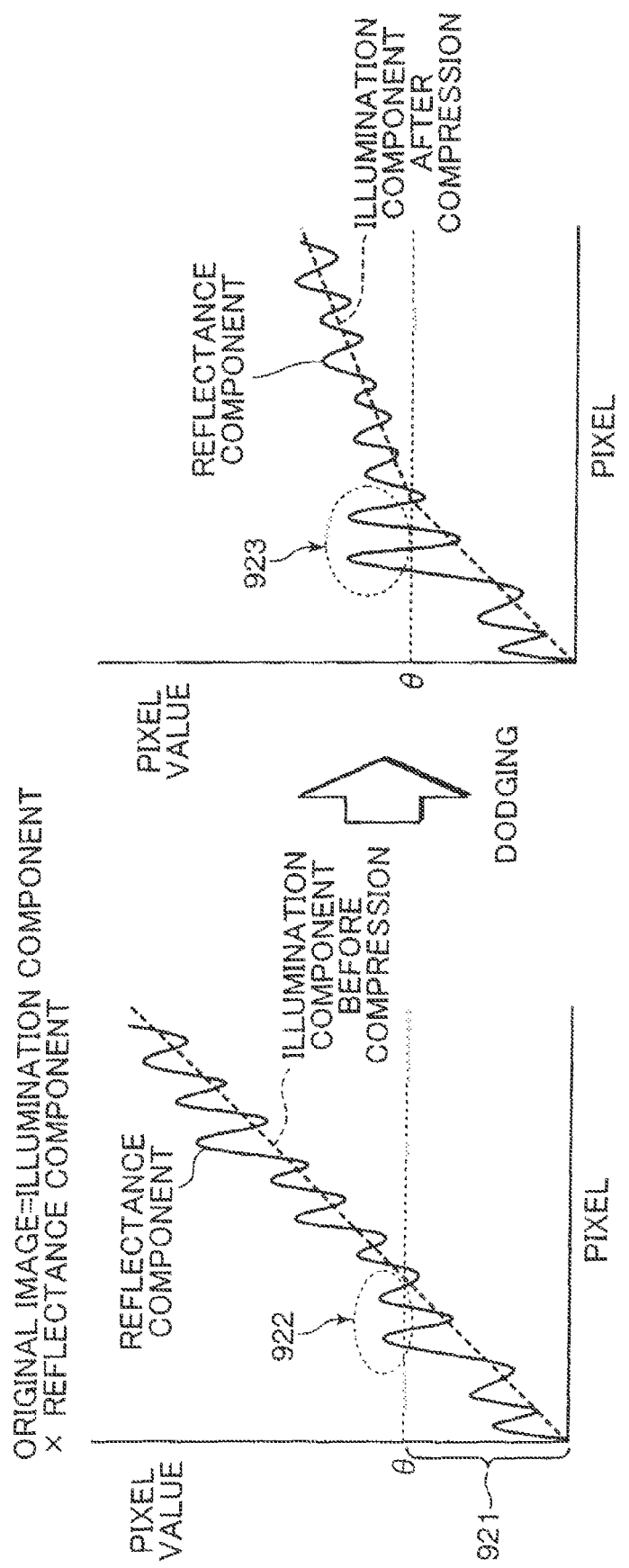

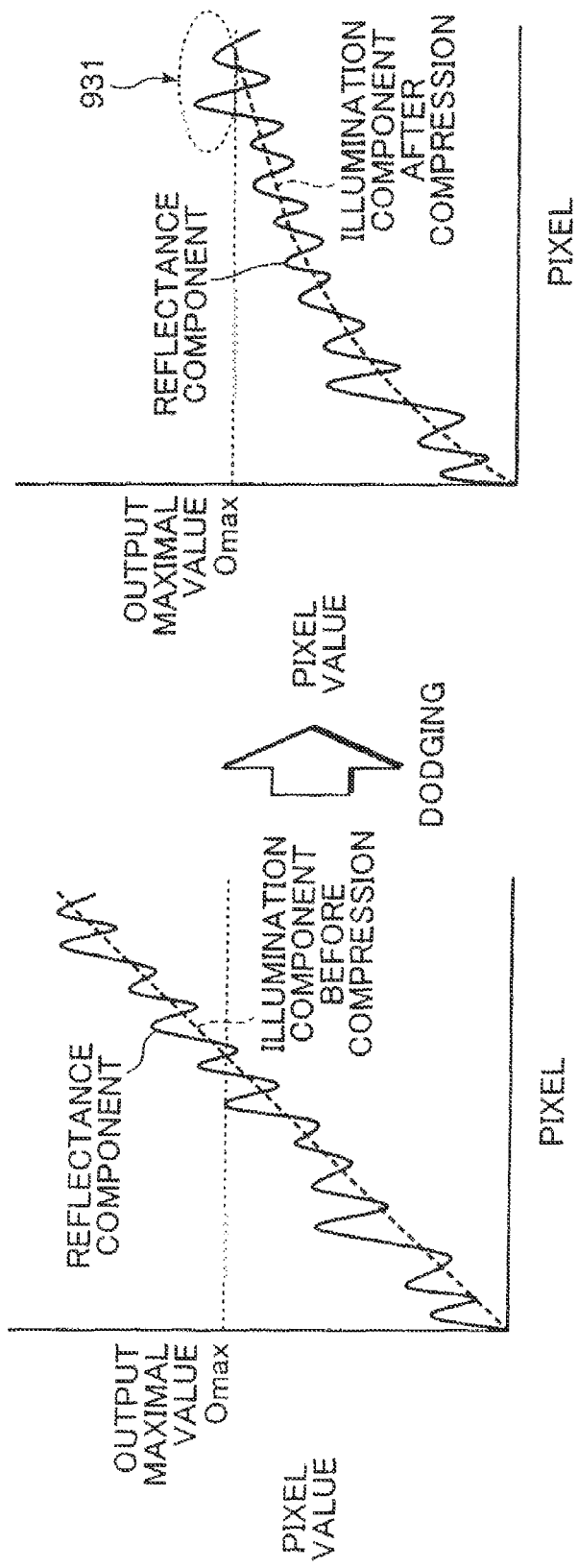

IMAGE SENSING APPARATUS AND IMAGE PROCESSING METHOD

This application is a divisional application of application Ser. No. 11/502,269, filed Aug. 10, 2006, which is based on Japanese Patent Application No. 2005-235987, No. 2005-235988, No. 2006-131740, and No. 2006-131741 filed on Aug. 16, 2005, Aug. 16, 2005, May 10, 2006, and May 10, 2006, respectively, the contents of which are hereby incorporated by reference.

BACKGROUND OF THE INVENTION

1. Field of the Invention

The present invention relates to an image sensing apparatus such as a digital camera, and more particularly to an image sensing apparatus having a dynamic range compression function, and an image processing method adapted to the image sensing apparatus.

2. Description of the Related Art

In recent years, image sensing apparatuses such as digital cameras have a challenging task of providing an image sensor capable of enlarging a luminance range i.e. a dynamic range of a subject image to meet a demand for high-quality image reproduction. Concerning a technique on the dynamic range enlargement, there is known an image sensor having an output characteristic that an electrical signal in a high luminance area is logarithmically converted commensurate with the amount of incident light by utilizing, for instance, a sub-threshold characteristic of a MOSFET, in other words, an image sensor (hereinafter also called as "linear-logarithmic sensor") having a photoelectric conversion characteristic comprising a linear characteristic area and a logarithmic characteristic area. As mentioned above, the linear-logarithmic sensor has the output characteristic that an electrical signal is natural logarithmically converted commensurate with the amount of incident light. Accordingly, the linear-logarithmic sensor enables to secure a wider dynamic range than an image sensor having a photoelectric conversion characteristic solely in a linear characteristic area.

Whereas a sensing device such as the linear-logarithmic sensor has succeeded in securing a wide dynamic range, a display device such as a monitor has not succeeded in securing a wide dynamic range, as compared with the sensing device. Even if a wide dynamic range is obtained for an input image, the effect of the wide dynamic range cannot be satisfactorily exhibited on the display device. In view of this, it is necessary to compress a dynamic range of the input image so as to display the input image having the wider dynamic range within the dynamic range of the display device.

"To compress a dynamic range" has two meanings: one is to locally adjust the contrast of an image, specifically, to increase the contrast i.e. the gradation by compressing an illumination component of an image; and the other is to literally compress the dynamic range while maintaining the contrast distribution on the entire image, in other words, to uniformly compress the entire image without local adjustment of the contrast. Hereinafter, the former technique is called as "dodging or dodging processing", and the latter technique is called as "dynamic range compression" to distinguish one from the other. As will be described later, it is technically proper to conclude that the illumination component is substantially a low-frequency component, and a reflectance component to be described later is a high-frequency component.

Conventionally, the dodging is performed by: extracting an illumination component out of an image, while, at the same time, extracting a reflectance component; compressing a dynamic range of the illumination component; and generating a new image where the contrast of the image is locally adjusted, based on the illumination component after the dynamic range compression, and the reflectance component. Japanese Patent Application No. 2004-377875 (D1) discloses an example of the technique concerning the dodging. As shown in FIG. 16, the technique comprises: dividing an image (hereinafter, called as "linear-logarithmic image", which corresponds to an original image "I" to be described later) having a photoelectric conversion characteristic comprising a linear characteristic area and a logarithmic characteristic area, which is obtained by a linear-logarithmic sensor, into a logarithmic image "I1" and a linear image "I2" for extraction; dodging the respective images; and synthesizing the dodged images. In the technology, an image synthesizer is provided to prevent degradation of an S/N ratio. Specifically, as shown in FIG. 17, in the case where the pixel value of an image "I'" obtained by the synthesis of the logarithmic image and the linear image after the dodging is larger than the pixel value of the original image "I", namely, image I'>image I, the image synthesizer is operative to select the original image "I" indicated by 902 instead of the image "I'" indicated by 901.

Also, Japanese Patent No. 2509503 (D2) discloses a technique comprising: classifying image signals into a large-value group and a small-value group, using a reference value; and performing dynamic range compression for the respective groups with use of different correction data for dynamic range compression so as to keep the contrast of a portion of the image having an initially sufficient contrast from unduly lowering by image compression.

In the technology disclosed in D1, however, the compression ratio is set in accordance with the dynamic range of an input image. Accordingly, there is likelihood that an illumination component of a main subject image i.e. a main subject luminance may be compressed, which leads, for example, to gradation non-uniformity on a human face image, which is a generally important part of a photo, e.g. appearance of a so-called "whiteout", an overexposed appearance of a face image, which normally appears bright. Specifically, as shown in FIG. 18, if a main subject luminance lies within the luminance range indicated by 911, the contrast may be unduly lowered by the dynamic range compression. The drawback may be avoided by using the technique shown in D2, namely, by keeping an area indicated by 921 in FIG. 19, which is a portion of the original image having a pixel value smaller than a predetermined value θ from dodging. If, however, dodging is performed for a reflectance component in an area indicated by 922 where the pixel value is equal to or larger than the predetermined value θ, as mentioned above, there occurs a drawback that image I'>image I, which may degrade the S/N ratio. In other words, unduly increase of brightness on a dark image area may increase a noise component, which may resultantly degrade the image quality. Also, in the technology of D1, after the dodging of the entire image, the image "I'" and the image "I" are compared, which requires an extended processing time. Generally, most of the processing time required in dodging is spent for extraction of an illumination component, using an edge keeping filter such as a median filter or an epsilon filter.

SUMMARY OF THE INVENTION

In view of the above problems residing in the prior art, it is an object of the present invention to provide an image sensing apparatus and an image processing method that enable to eliminate likelihood of contrast lowering in a main subject image by compression of a low-frequency component i.e. an illumination component of the main subject image in a dodging processing, and to shorten a processing time.

An aspect of the invention is directed to an image sensing apparatus comprising: an image sensing device for sensing light representing a subject image; a first component extractor for extracting a first component having a predetermined frequency out of a photographic image obtained by the image sensing device; a second component extractor for extracting a second component having a frequency higher than the frequency of the first component, out of the photographic image; a compressor for compressing a dynamic range of the first component extracted by the first component extractor with a predetermined compression ratio; an image generator for generating an image based on a compressed first component obtained by compressing the dynamic range of the first component by the compressor, and the second component extracted by the second component extractor; and a level value setter for setting a level value of the first component to a predetermined value, wherein the compressor compresses the dynamic range of the first component in an area where a value of the first component is equal to or larger than the level value of the first component set by the level value setter.

These and other objects, features and advantages of the present invention will become more apparent upon reading of the following detailed description along with the accompanying drawings.

BRIEF DESCRIPTION OF THE DRAWINGS

FIG. 7 is a diagram showing how an image sensing area to be metered is divided into blocks according to multi-pattern metering.

FIGS. 8 through 11B are graphs showing a dynamic range compression processing in modifications.

FIG. 9 is a graph showing a dynamic range compression processing in another modification.

FIG. 10 is a graph showing a dynamic range compression processing in yet another modification.

FIG. 11B is a graph showing a dynamic range compression processing in a still further modification.

FIGS. 16 through 20 are graphs describing a conventional dodging processing.

DETAILED DESCRIPTION OF THE PREFERRED EMBODIMENTS OF THE INVENTION

First Embodiment

Figure 1:
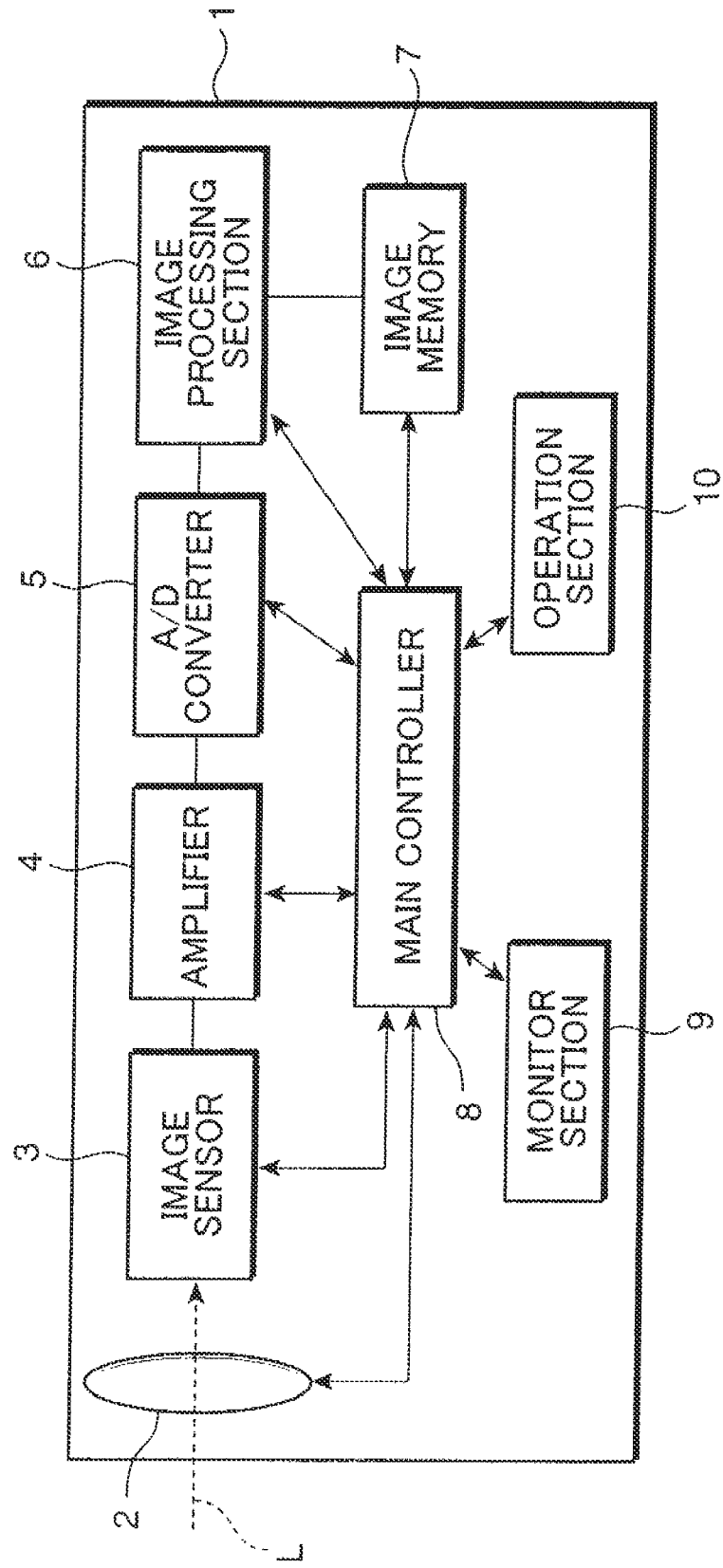
FIG. 1 is a block diagram schematically showing parts primarily relating to an image sensing process of a digital camera, which is an example of an image sensing apparatus according to a first embodiment of the invention.

FIG. 1 is a block diagram schematically showing parts primarily relating to an image sensing process of a digital camera, which is an example of an image sensing apparatus according to a first embodiment of the invention. As shown in FIG. 1, the digital camera 1 includes a lens unit 2, an image sensor 3, an amplifier 4, an analog-to-digital converter (A/D converter) 5, an image processing section 6, an image memory 7, a main controller 8, a monitor section 9, and an operation section 10.

The lens unit 2 functions as a lens aperture for receiving light representing a subject image i.e. a light image, and includes an optical lens system for guiding the light image toward the image sensor 3 disposed inside a camera body. The optical lens system includes, for instance, zoom lens elements arrayed in series along an optical axis L of the light image, a focusing lens element, and other fixed lens block. The lens unit 2 has a diaphragm (not shown) for regulating the amount of light transmitted through the lens elements, and a shutter (not shown). The main controller 8 controls driving of the diaphragm and the shutter.

The image sensor 3 photo-electrically converts the light image formed through the lens unit 2 into image signals of respective color components of red (R), green (G), and blue (B) according to the amount of light from the subject for outputting to the amplifier 4, which is described later. In this embodiment, the image sensor 3 uses a log conversion type solid-state image sensing device having a photoelectric conversion characteristic comprising: a linear characteristic area where an output pixel signal i.e. an output electrical signal generated by photoelectric conversion is linearly converted for output when the incident luminance of the light image obtained by the image sensor 3 is low, namely, the light image is dark; and a logarithmic characteristic area where the output pixel signal is logarithmically converted for output when the incident luminance of the light image is high, namely, the light image is bright. In other words the image sensor 3 has a photoelectric conversion characteristic with a linear curve in a low luminance range and a logarithmic curve in a high luminance range. The switching point (hereinafter, called as "inflection point") between the linear characteristic area and the logarithmic characteristic area of the photoelectric conversion characteristic is controllable by a specific control signal applied to the respective pixel circuits of the image sensor 3.

Specifically, the image sensor 3 is, for instance, a CMOS image sensor comprising: a solid-state image sensing device constituted of photoelectric conversion elements such as photodiodes in a matrix; and a log conversion circuit equipped with a p-type or n-type MOSFET, or a like device, wherein an output characteristic of the solid-state image sensing device is such that an electrical signal is logarithmically converted commensurate with the amount of incident light by utilizing a subthreshold characteristic of the MOSFET. Alternatively, the image sensor 3 may be a VMIS image sensor, a CCD image sensor, or a like sensor.

The amplifier 4 amplifies an image signal outputted from the image sensor 3. The amplifier 4 includes an auto gain control (AGC) circuit, for instance, to adjust a gain i.e. an amplification ratio of the outputted image signal. Alternatively, the amplifier 4 may include, in addition to the AGC circuit, a correlation double sampling (CDS) circuit of reducing noise in sampling of the image signal as an analog value.

The A/D converter 5 converts the analog image signal amplified by the amplifier 4 into a digital image signal. The A/D converter 5 converts pixel signals detected on the respective pixels of the image sensor 3 into pixel data of 12 bits, for instance.

The image processing section 6 performs various image processing such as color interpolation/color correction, white balance correction, and gradation conversion processing based on dodging, which is a primary feature of the embodiment, for image signals acquired by the A/D conversion in the A/D converter 5. The gradation conversion processing in the image processing section 6 will be described later in detail. The image processing section 6 may include, in addition to the aforementioned functioning parts, an FPN corrector (not shown) for removing a fixed pattern noise (FPN) in a signal, and a black reference corrector (not shown) for correcting a black level of a digital image signal outputted from the A/D converter 5 into a reference value.

The image memory 7 includes a memory such as an ROM and an RAM, and stores image data after the image processing in the image processing section 6, and the like. The image memory 7 has a capacity capable of storing image data corresponding to a certain number of frames obtained by photographing, for instance.

The main controller 8 includes an ROM for storing various control programs, an RAM for temporarily storing data, and a central processing unit (CPU) for reading out the control program or the like from the ROM for execution of the program. The main controller 8 centrally controls overall operations of the digital camera 1. Specifically, the main controller 8 calculates control parameters necessary for the respective parts of the digital camera 1 based on various signals outputted from the respective parts such as the image sensor 3 to control operations of the respective parts based on the control parameters via a timing generator (not shown) or a driver (not shown), for instance. As a feature of this embodiment, the main controller 8 controls various processing operations such as an illumination component compression and a characteristic conversion in the gradation conversion processing of the image processing section 6.

The monitor section 9 displays, on a monitor, an image obtained by the image sensor 3, an image stored in the image memory 7, or the like. The monitor section 9 includes a liquid crystal display (LCD) equipped with a color liquid crystal display device arranged on a rear surface of the digital camera 1, for instance.

The operation section 10 allows a user to input operation commands for the digital camera 1, and includes, for instance, various operation switches i.e. operation buttons such as a power switch, a release switch, a mode setting switch for setting various photographing modes, and menu selection switches. For instance, when the release switch is pressed down, an image shooting operation, namely, a series of operations comprising: sensing light representing a subject image by the image sensor 3; applying a predetermined image processing to image data acquired by the sensing operation; and recording the processed signal in the image memory 7 or a like device, are executed.

Figure 2:
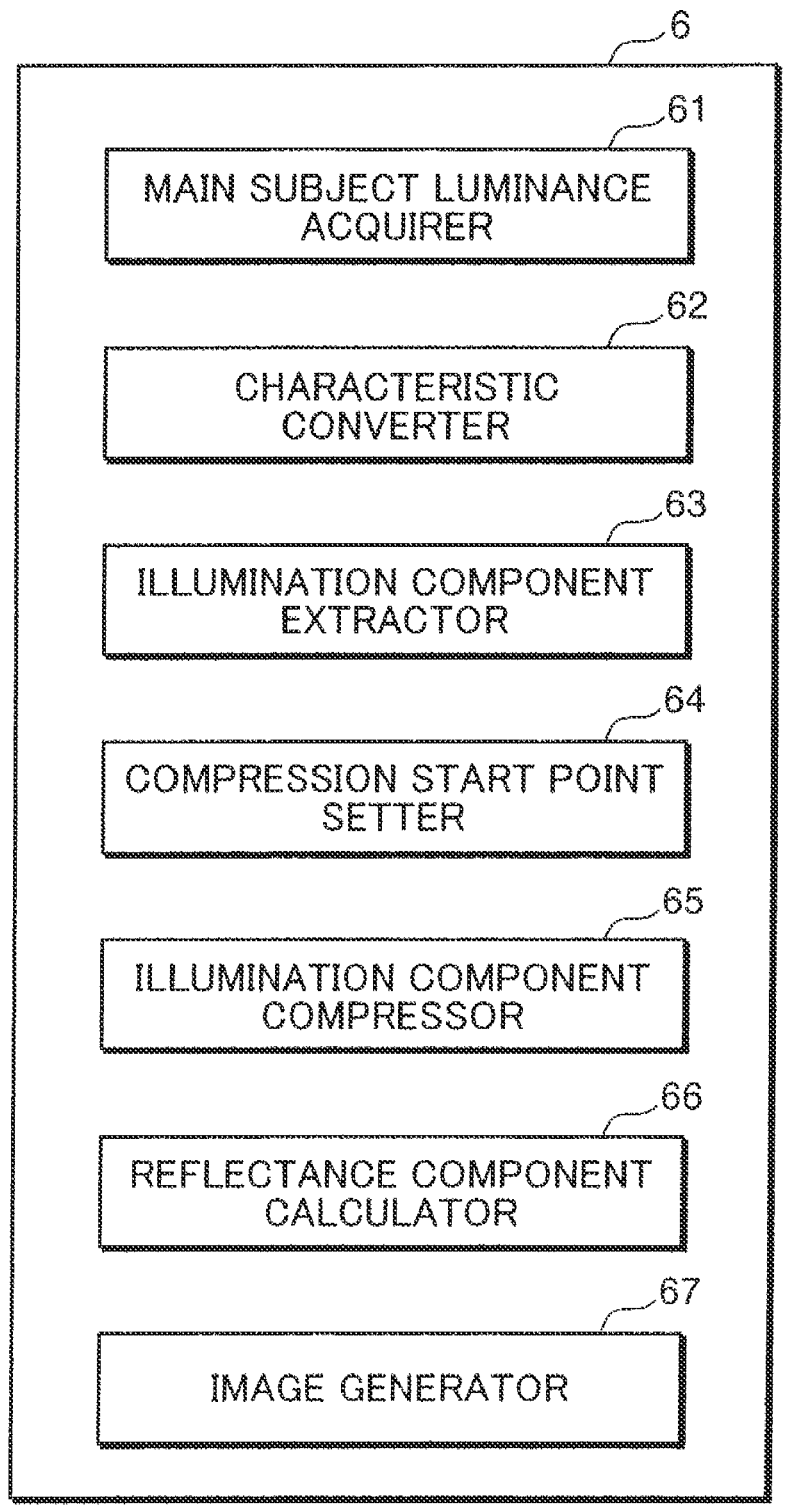
FIG. 2 is a block diagram showing functional parts of an image processing section of the digital camera.

In the following, an arrangement and an operation of the image processing section 6 concerning the function of the gradation conversion processing are described. FIG. 2 is a block diagram showing functional parts of the image processing section 6. As shown in FIG. 2, the image processing section includes a main subject luminance acquirer 61, a characteristic converter 62, an illumination component extractor 63, a compression start point setter 64, an illumination component compressor 65, a reflectance component calculator 66, and an image generator 67.

The main subject luminance acquirer 61 acquires i.e. calculates the luminance of a main subject image within a photographic image i.e. an original image "I" acquired by an image sensing operation by the image sensor 3. As shown in FIG. 7, the main subject luminance acquirer 61 divides an image sensing area 400 corresponding to the original image "I", by a multi-pattern metering, into, for instance, a central area called as "main subject image area 410", which is a central part of the image sensing area 400 and consists of thirty-six detection blocks i.e. blocks A through AJ; and a peripheral area called as "peripheral subject image area 420", which is a peripheral part around the central part and consists of sixteen detection blocks i.e. first through sixteenth detection blocks. After the image dividing, the main subject luminance acquirer 61 calculates, for instance, an average luminance based on luminance information on a subject image detected from the respective detection blocks, and sets the average luminance as a main subject luminance. In this embodiment, a histogram, namely, distribution of a main subject luminance with respect to each of the detection blocks A through AJ may be calculated, and a histogram of the main subject luminance in the entirety of the main subject image area 410, namely, a main subject entire luminance histogram may be calculated with use of the main subject luminance histograms with respect to the detection blocks A through AJ. Further, an average luminance with respect to the main subject image area 410 may be calculated based on the main subject entire luminance histogram. In calculating the average luminance, so-called "Gaussian pruning" or clipping may be performed using a specified threshold value. Further alternatively, luminance information on the peripheral subject image area 420 i.e. a peripheral subject luminance histogram, which is obtained with respect to each of the first through sixteenth detection blocks, or a peripheral subject entire luminance histogram, which is a histogram obtained with respect to the entirety of the peripheral subject image area 420 based on the peripheral subject luminance histograms with respect to the first through sixteenth detection blocks, may be used. The method of calculating the main subject luminance is not limited to the above, and various approaches other than the above can be applied. Also, a maximum luminance or a minimum luminance may be used as the main subject luminance, in place of the average luminance.

Figure 3:
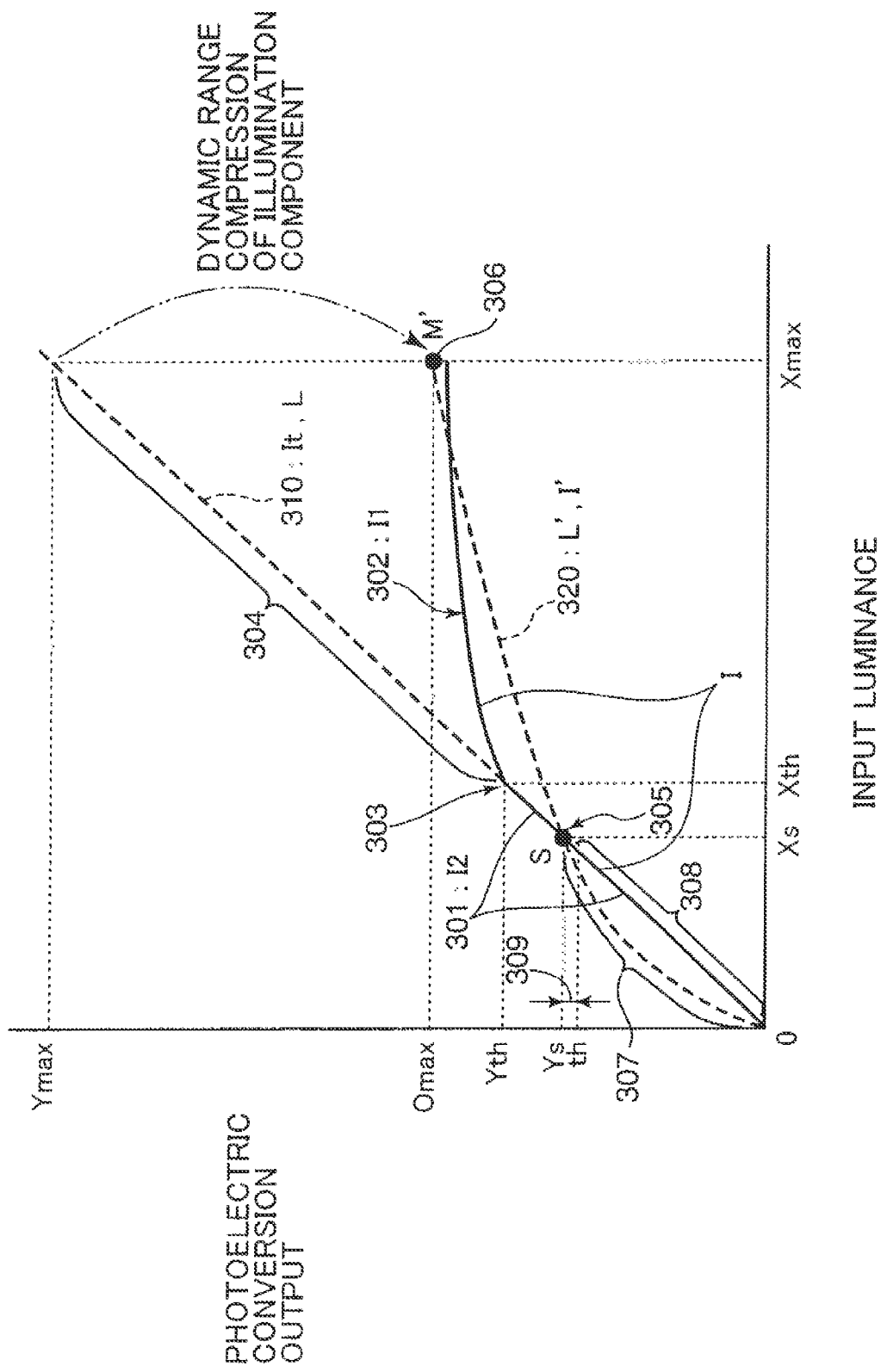
FIG. 3 is a graph showing a dodging processing by a gradation conversion processing in the image processing section.

FIG. 3 is a graph showing a dodging processing by the gradation conversion processing in the image processing section 6. As shown in FIG. 3, the characteristic converter 62 unifies a linear characteristic 301 and a logarithmic characteristic 302, namely, performs characteristic unification for the original image "I" having a photoelectric conversion characteristic comprising the linear characteristic 301 and the logarithmic characteristic 302. The original image "I" is an input image obtained from the image sensor 3 as a linear-logarithmic sensor, and has a photoelectric conversion characteristic i.e. a relational expression described by the mathematical expressions (1) and (2), where "x" is an input luminance and "y" is a pixel value in correspondence to the input luminance. Referring to FIG. 3, the coordinate point (Xth, Yth) represents an inflection point 303, the expression (1) represents an image "I2" having the linear characteristic 301, and the expression (2) represents an image "I1" having the logarithmic characteristic 302. The symbol "*" in the equations (1) and (2) represents multiplication, and "a", "b", "α", and "β" represent predetermined coefficients, respectively. The same indication is applied for the rest of the mathematical expressions in the specification and claims.

$$y = a*x + b \quad (0 \leq x \leq Xth) \quad (1)$$

$$y = \alpha*\log(x) + \beta \quad (x > Xth) \quad (2)$$

The characteristic converter 62 converts the logarithmic characteristic 302 into a linear characteristic 304, which has the same characteristic as the linear characteristic 301. In this case, assuming that the pixel value of the image sensor 3 is "i", an image "It", indicated by 310, having a photoelectric conversion characteristic comprising the linear characteristic 301 and the linear characteristic 304, which is obtained by the characteristic unification, is given by characteristic conversion based on the following mathematical expression (3) where the symbol "/" represents division.

if (i>Yth)

$$It = a*\exp((i-\beta)/\alpha) + b$$

else $$It = i \quad (3)$$

The characteristic converter 62 converts the logarithmic characteristic 302 into the linear characteristic 304, using a predetermined lookup table (hereinafter, also called as "conversion LUT"). The conversion LUT may be stored in a lookup table storage (not shown) provided in the characteristic converter 62.

The illumination component extractor 63 extracts an illumination component out of the image "It", which is a linear image obtained by the characteristic unification. The image "It" is expressed by the following mathematical expression (4), according to the Retinex theory, where "L" is an illumination component in the image "It", and "R" is a reflectance component in the image "It". The linear graph representing the image "It" is handled as the illumination component "L" extracted out of the image "It", when needed.

$$It = L*R \quad (4)$$

The illumination component "L" is extracted out of the image "It", using a so-called edge keeping filter i.e. a nonlinear filter such as a median filter or an epsilon (ε) filter. The extraction is described by the mathematical expression (5).

$$L = F(It) \quad (5)$$

where "F" is an edge keeping filter. A normally used low-pass filter (LPF) i.e. a linear filter in a narrow sense is designed to pass solely a low-frequency component. Such a low-pass filter is incapable of accurately extracting an illumination variation at an edge of an image. Specifically, performing a dynamic range compression based on the extracted signal using the linear filter may, for instance, generate artifacts where an excessively dark image appears. The edge keeping filter is used to avoid the drawback and to accurately extract an illumination component at the edge of the image.

The compression start point setter 64 sets a compression start point "S" indicated by 305, specifically, a compression start level "Ys" in compressing the illumination component "L" extracted out of the image "It". Alternatively, a compression start level "Xs" may be defined in terms of input luminance. The compression start level "Ys" is so set as to obtain a luminance equal to or larger than the main subject luminance, which corresponds to the average luminance or the like. The compression start level "Ys" equal to or larger than the value of the main subject luminance may be obtained by multiplying the main subject luminance by a predetermined value, for instance. The value used in the multiplication i.e. a magnification may be in a range from about two to about three, which is sufficient to obtain proper brightness by gamma correction if the main subject image is a human face, or about two if the main subject image is a landscape.

The magnification is not limited to the above, and may be an arbitrary value. Also, the magnification may be a fixed value that is calculated based on a predefined subject image, or be set variable each time a subject image is selected. In the later case, the magnification may be selected from plural fixed values, based on a command inputted by a user on the operation section 10, or may be automatically selected from plural fixed values in accordance with the main subject luminance acquired by the main subject luminance acquirer 61 based on the metering result. Further alternatively, the magnification may be set depending on the kind of the main subject image identified by a photographing mode e.g. portrait mode or landscape mode, which is obtained based on the metering result, or the photographic magnification i.e. the focal length. Particularly, in the case where a human face is photographed, the compression start level "Ys" may be a maximum brightness within a face area detected by the method disclosed in Japanese Unexamined Patent Publication No. 7-128031 or Japanese Patent No. 3557659, or a like technique. In any case, it is preferable to properly set the compression start level "Ys" according to the kind of the main subject image or the subject image, or luminance information, and to set the compression start level "Ys" higher than the level of the main subject luminance by a predetermined value, in place of setting the compression start level "Ys" equal to or approximate to the main subject luminance level. This enables to securely eliminate an adverse effect to the main subject image by dynamic range compression, irrespective of the difference in subject images.

The method for setting the compression start level "Ys" equal to or larger than the main subject luminance level is not limited to the foregoing. For instance, a predetermined luminance histogram based on luminance information of the main subject and/or the peripheral subject may be calculated to set a predetermined level within an area corresponding to the main subject luminance level or higher, e.g. a luminance value i.e. a luminance level having a smaller frequence, as the compression start level "Ys". Specifically, assuming that a luminance histogram i.e. a luminance distribution has a substantially inverted "U" or "V" shaped curve, and the main subject luminance lies at or near the apex of the luminance histogram, the compression start level is set near the position corresponding to a bottom of the curve where the frequence of the luminance equal to or larger than the main subject luminance is small. Performing compression, using the luminance value having the small frequence as the compression start level "Ys", allows for suppressing a change in gradation characteristic, because this technique enables to eliminate compression in an image area having a large frequence in the luminance histogram. The setting of the compression start level "Ys" based on the luminance histogram may be performed each time a photographic image is obtained by the image sensor 3.

In the case where the image sensor 3 is a linear-logarithmic sensor as described in the embodiment, the compression start level "Ys" may be obtained by, for instance, implementing the equation: Ys=Yth*P where "P" is a multiple number smaller than 1, so that the compression start level "Ys" is varied in association with an inflection point level "Yth". This is possible because the inflection point level "Yth" is set to a value larger than the main subject luminance level in performing automatic exposure control i.e. AE control by the digital camera 1, in other words, before the dodging processing in this embodiment is performed. The AE control is performed, using an evaluation value for the AE control i.e. an AE evaluation value, which is acquired in the image processing section 6 based on the photographic image. As far as the compression start level "Ys" is settable to such a level as not to cause gradation non-uniformity of the main subject image by dynamic range compression of the main subject luminance, any one of the techniques can be applied.

The illumination component compressor 65 performs dynamic range compression for the illumination component "L" extracted out of the image "It" by the illumination component extractor 63. After the dynamic range compression by the illumination component compressor 65, the illumination component "L" indicated by 310 turns into an illumination component "L'" indicated by 320. The illumination component "L'" is given by the following mathematical expression (6).

$$L'=\exp(\log(L)*c)*n \qquad (6)$$

where "c" is a dynamic range compression ratio, and "n" is a normalization term.

As shown in FIG. 3, by implementing the dynamic range compression for the illumination component, the illumination component image having a dynamic range between 0 to Ymax, which is a maximal value of the linear characteristic, is compressed in such a manner that the illumination component image has a sensing dynamic range between 0 to Omax. "Omax" is a maximal output value of a predetermined image outputting device, e.g. a maximal output value or a maximal pixel value of the image sensor 3. "Omax" has a gradation value "255" in the case of an 8-bit image, for instance. The function "L'", described by the expression (6), which represents the illumination component after the dynamic range compression, passes two points, i.e., the compression start point "S" (Xs, Ys), and a compression level point "M'" (Xmax, Omax), indicated by 306, at the maximal output value "Omax" or a maximal input luminance "Xmax". Accordingly, the two unknowns "c" and "n" in the expression (6) can be calculated based on simultaneous equations obtained by substituting the coordinate values at the points "S" and "M'", respectively. The parameter "n" is used in the dynamic range compression in addition to the compression parameter "c" for the following reason. The output image i.e. the photographic image obtained by the image sensor 3 has a dynamic range corresponding to 0 to 255 gradations in the case of an 8-bit image. If the illumination component "L'" after the dynamic range compression has gradations ranging from 0 to 100, for instance, using the value "n"=2.5 to conform to the dynamic range from 0 to 255 enables to expand the entirety of the gradation values by 2.5 times, namely, enables to normalize the illumination component "L'".

The compression start point "S" is set in the dynamic range compression for the illumination component "L" so that the dynamic range compression is not performed for the main subject luminance. In view of this, whereas the illumination component compressor 65 uses the compression characteristic 320 having a compression characteristic 307 in the dynamic range compression for the illumination component "L", the illumination component compressor 65 uses the original image "I" as an output value in an area where the illumination component "L" has a value smaller than the compression start level "Ys", without using the illumination component "L'" obtained based on the compression characteristic 320.

The reflectance component calculator 66 calculates i.e. extracts a reflectance component "R" out of the image "It". The reflectance component "R" is calculated by the mathematical expression (7), using the illumination component "L". The expression (7) is derived from the expression (4).

$$R=It/L \qquad (7)$$

The image generator 67 generates a new image "I'" after the dodging processing out of the original image "I" by implementing the mathematical expression (8), using the illumination component "L'" obtained by the illumination component compressor 65, and the reflectance component "R" obtained by the reflectance component calculator 66.

$$I'=L'*R \qquad (8)$$

In FIG. 3, the image "I'" is obtained by multiplying the entirety of the illumination component "L'" indicated by 320 by the reflectance component "R".

Figure 4:
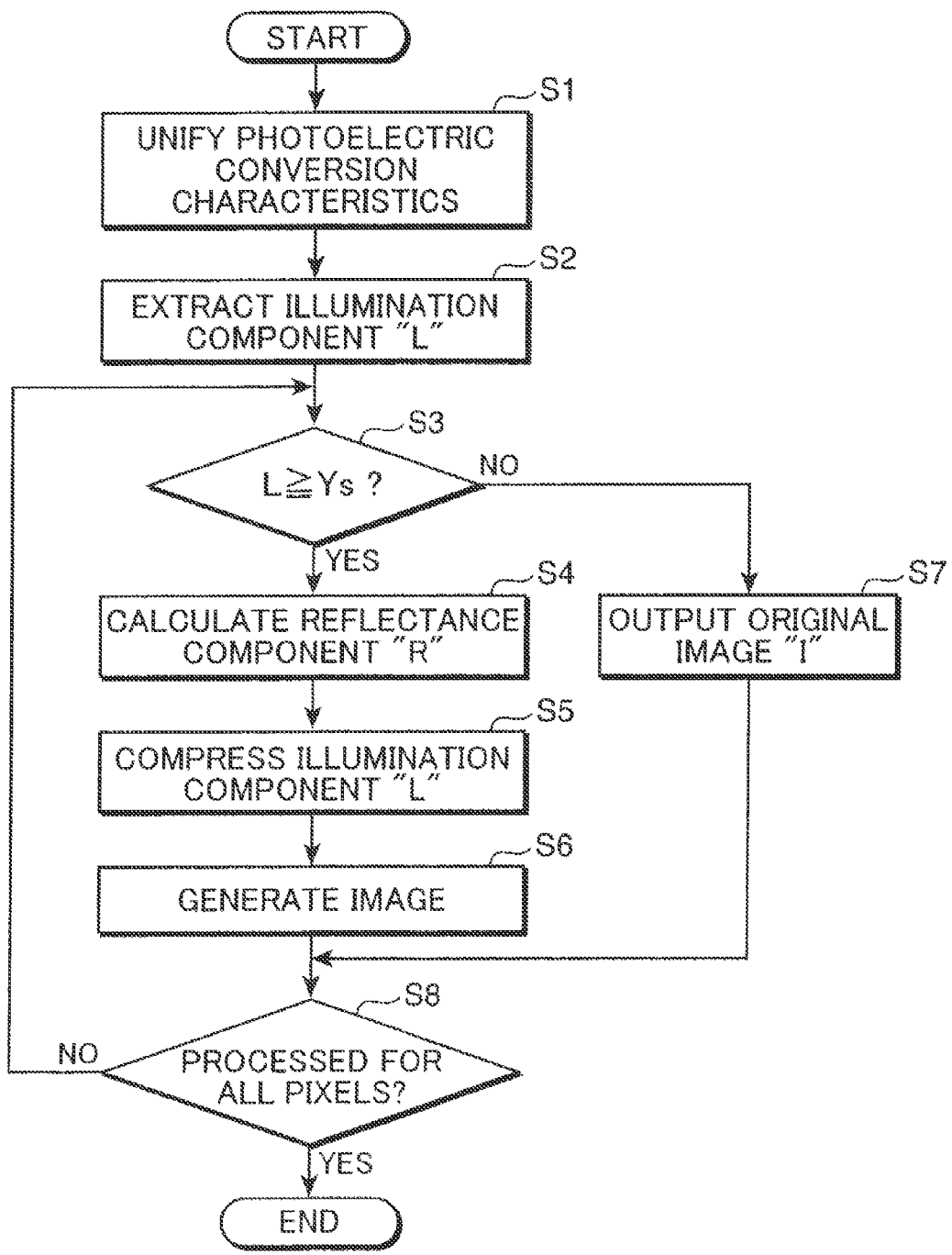
FIG. 4 is a flowchart showing an example of an operation concerning a dodging processing to be executed by the digital camera in the first embodiment.

FIG. 4 is a flowchart showing an example of an operation concerning the dodging processing to be executed by the digital camera 1 in the first embodiment. First, the characteristic converter 62 unifies characteristics into a linear characteristic so as to obtain the image "It" (in Step S1). Then, the illumination component extractor 63 extracts the illumination component "L" out of the image "It" by a filter processing using the edge keeping filter i.e. a non-linear filter. The illumination component extraction is carried out simultaneously for all the pixels of the image "It" (in Step S2). Thereafter, the compression start point setter 64 sets the compression start level "Ys", and if the illumination compression compressor 65 judges that the illumination component "L" has a value equal to or larger than the compression start level "Ys" (YES in Step S3), the reflectance component calculator 66 calculates the reflectance component "R" (in Step S4). Then, the illumination component compressor 65 performs dynamic range compression for the illumination component "L" based on the information relating to the compression start point "S" corresponding to the compression start level "Ys", and the compression level point "M'" to obtain the illumination component "L'" (in Step S5). Thereafter, the image "I'" is generated based on the reflectance component "R" and the illumination component "L'" obtained in Steps S4 and S5, for output (in Step S6). If the illumination component "L" is judged to have a value lower than the compression start level "Ys" in Step S3 (NO in Step S3), the original image "I" is selected for output (in Step S7). The operations from Steps S3 through S7 are sequentially executed for each pixel of the illumination component "L". After the operations from Steps S3 through S7 are completed for all the pixels (YES in Step S8), the flow is ended. If, on the other hand, the operations from Steps S3 through S7 are not completed for all the pixels (NO in Step S8), the flow returns to Step S3 to cyclically repeat the operations from Steps S3 through S7 until the operations from Steps S3 through S7 are completed for all the pixels.

Second Embodiment

The digital camera 1 in the first embodiment uses the edge keeping filter to extract the illumination component "L". In view of a point that it takes a time to perform the illumination component extraction using the edge keeping filter, a digital camera 1a in a second embodiment of the invention adopts a technique that a provisional illumination component image (hereinafter, called as "provisional illumination image") is obtained prior to the illumination component extraction, and a dodging processing is performed based on the provisional illumination image. The dodging processing in the second embodiment is performed as follows.

Figure 5:
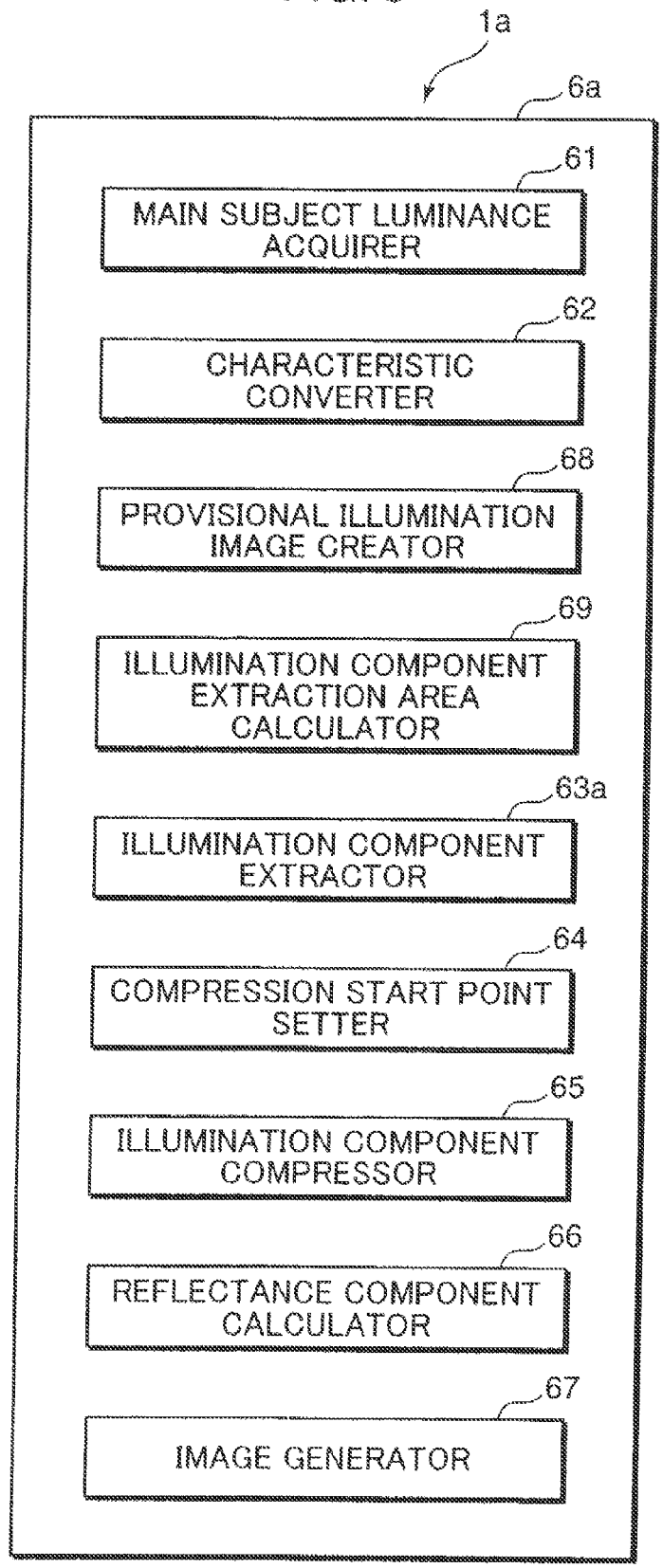
FIG. 5 is a block diagram showing functional parts of an image processing section of a digital camera, which is an example of an image sensing apparatus according to a second embodiment of the invention.

FIG. 5 is a block diagram showing functional parts of an image processing section 6a in the digital camera 1a. As shown in FIG. 5, the image processing section 6a includes a provisional image creator 68 and an illumination component extraction area calculator 69, in addition to functional parts corresponding to the functional parts of the image processing section 6. An illumination component extractor 63a in the image processing section 6a is different from the illumination component extractor 63 in the image processing section 6. The arrangement of the other functional parts in the second embodiment is substantially the same as the arrangement of the other functional parts in the first embodiment, and accordingly, description thereof will be omitted herein.

The provisional illumination image creator 68 creates a provisional illumination image corresponding to a so-called "blur image". The blur image is created by a filter processing using an LPF i.e. a linear filter such as a Gaussian filter for an image "It" obtained by characteristic unification by the characteristic converter 62. Since the LPF for use in creating the blur image is normally mounted as a hardware component in a digital camera, the provision of the LPF secures high-speed processing. The provisional illumination image may be a contracted image i.e. an interpolated image used for AE control i.e. for use in acquiring an AE evaluation value, which is prepared prior to the dodging processing.

The illumination component extraction area calculator 69 calculates an illumination component extraction area where an illumination component is extracted out of a photographic image using an edge keeping filter, and a dynamic range compression is performed, based on the provisional illumination image created by the provisional illumination image creator 68. Specifically, the illumination component extraction area calculator 69 judges whether a pixel value of the provisional illumination image is equal to or larger than a predetermined threshold value "th", and sets an area having the pixel value larger than the threshold value "th" as an illumination component extraction area. The threshold value "th" has a level equal to or lower than a compression start level "Ys". The threshold value "th" is set equal to or lower than the compression start level "Ys" for the following reason. Even if it is judged that dynamic range compression is not necessary because the provisional illumination image is dark, there is likelihood that dynamic range compression is judged to be necessary at an actual illumination component extraction using the edge keeping filter. In view of this, it is necessary to provide a margin i.e. a range 309 between the compression start level "Ys" and the threshold value level "th", which is a sufficient margin to determine that dynamic range compression is not necessary in the actual illumination component extraction, in other words to determine that the targeted illumination component extraction area represents a solid black image. Alternatively, the threshold value "th" may be a fixed value which is pre-set or stored in the illumination component extraction area calculator 69, or a value selected by the user, or an automatically selected value from plural fixed values in accordance with the calculation of the compression start level "Ys" or the main subject luminance, each time the illumination component extraction area is calculated.

The illumination component extractor 63a extracts an illumination component "L" from the illumination component extract area on the photographic image, using an edge keeping filter corresponding to the edge keeping filter used in the illumination component extractor 63. The illumination component compressor 65 performs dynamic range compression for the illumination component "L" extracted from the illumination component extraction area.

Figure 6:
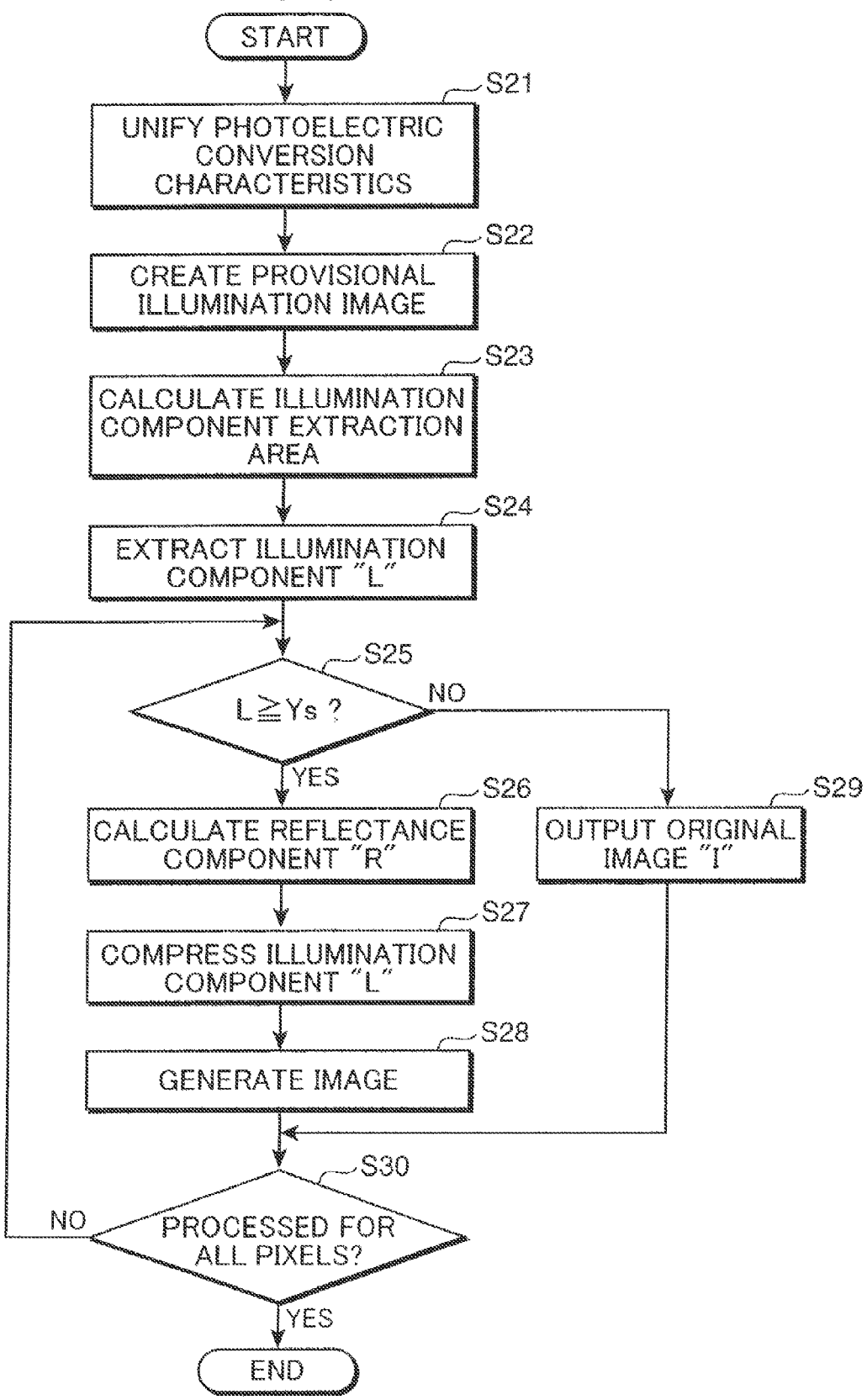
FIG. 6 is a flowchart showing an example of an operation concerning a dodging processing to be executed by the digital camera in the second embodiment.

FIG. 6 is a flowchart showing an example of an operation concerning the dodging processing to be executed by the digital camera 1a in the second embodiment. First, the characteristic converter 62 unifies characteristics into a linear characteristic so as to obtain the image "It" (in Step S21). Then, the provisional illumination image creator 68 creates the provisional illumination image based on a filter processing using the LPF i.e. a linear filter (in Step S22). Thereafter, the illumination component extraction area calculator 69 calculates the illumination component extraction area where the filter processing by the edge keeping filter is performed for the photographic image, based on the information relating to the provisional illumination image and the threshold value "th" (in Step S23). Next, the illumination component extractor 63 extracts the illumination component "L" of all the pixels in the illumination component extraction area of the image "It" (in Step S24). Then, the compression start point setter 64 sets the compression start level "Ys" corresponding to a compression start point "S", and if the illumination compression compressor 65 judges that the illumination component "L" has a luminance level equal to or larger than the compression start level "Ys" (YES in Step S25), the reflectance component calculator 66 calculates the reflectance component "R" (in Step S26). Then, the illumination component compressor 65 performs dynamic range compression for the illumination component "L" based on the information relating to the compression start point "S" corresponding to the compression start level "Ys", and the compression level point "M'" to obtain the illumination component "L'" (in Step S27). Thereafter, the image "I'" is generated based on the reflectance component "R" and the illumination component "L'" obtained in Steps S26 and S27, for output (in Step S28). If the illumination component "L" is judged to have a luminance level lower than the compression start level "Ys" in Step S25 (NO in Step S25), the original image "I" is selected for output (in Step S29). The operations from Steps S25 through S29 are sequentially executed for each pixel in the illumination component extraction area. After the operations from Steps S25 through S29 are completed for all the pixels in the illumination component extraction area (YES in Step S30), the flow is ended. If, on the other hand, the operations from Steps S25 through S29 are not completed for all the pixels (NO in Step S30), the flow returns to Step S25 to cyclically repeat the operations from Steps S25 through S29 until the operations from Steps S25 through S29 are completed for all the pixels.

Third Embodiment

Figure 16:
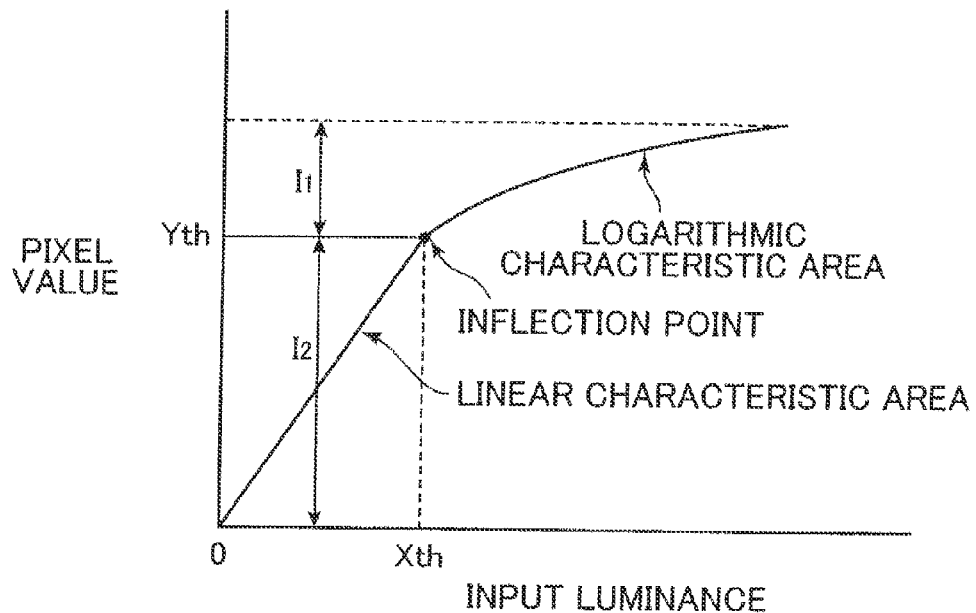
Figure 17:
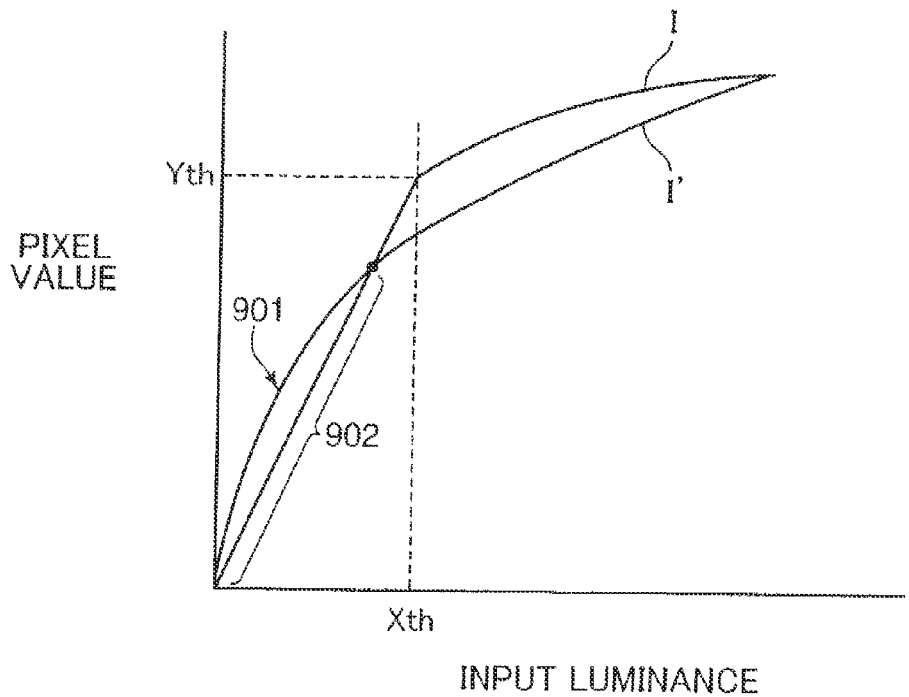

Referring back to FIG. 16, according to the conventional dodging processing, the linear-logarithmic image obtained by the linear-logarithmic sensor is divided into the logarithmic image "I1" and the linear image "I2" for extraction, the dodging processing is performed for the respective images, and the processed images are synthesized. The synthesized image is shown by the image "I'" in FIG. 17. Dynamic range compression is performed for the original image "I" as the input image i.e. the linear-logarithmic image so that the synthesized image "I'" has a dynamic range of the output image on a display device such as a monitor.

In the conventional dodging processing, if the original image "I" includes a subject image e.g. an image of clouds having a large reflectance in a high luminance area, the synthesized image "I'" may have an output value over the dynamic range of the output image, which may lead to contrast lowering. Specifically, as shown in FIG. 20, for instance, after the dodging processing, a pixel value of a reflectance component in a portion indicated by 931, which is over the maximal output value "Omax" of the dynamic range of the output image, is clipped at the maximal output value "Omax", in other words, all the pixel values over the value "Omax" become the value "Omax". This may cause gradation non-uniformity in a portion corresponding to the pixels having the output values over the maximal output value "Omax", and resultantly may lower the contrast. There are known a conversion technique of suppressing a high-frequency signal as the high-frequency signal is larger, and a conversion technique of adjusting the amplitude of a high-frequency component of an original image to be added to the original image after gradation conversion in accordance with the magnitude of the high-frequency component to overcome the drawback that the contrast in the high luminance area may be lowered. These techniques enable to avoid the drawback that the pixel values exceeding the dynamic range of the output image are clipped at the maximal output value "Omax", but fail to solve the drawback that the contrast in the high luminance area may be lowered.

In view of the above, a digital camera 1b in accordance with a third embodiment of the invention adopts an arrangement of: acquiring a reflectance in a high luminance area of an image; determining a compression ratio so as to increase the compression ratio in accordance with an increase of the reflectance; and performing dynamic range compression for an illumination component based on the determined compression ratio so as to prevent contrast lowering in a dodging processing even if a subject image has a large reflectance in the high luminance area. The dodging processing in the third embodiment is performed as follows.

Figure 12:
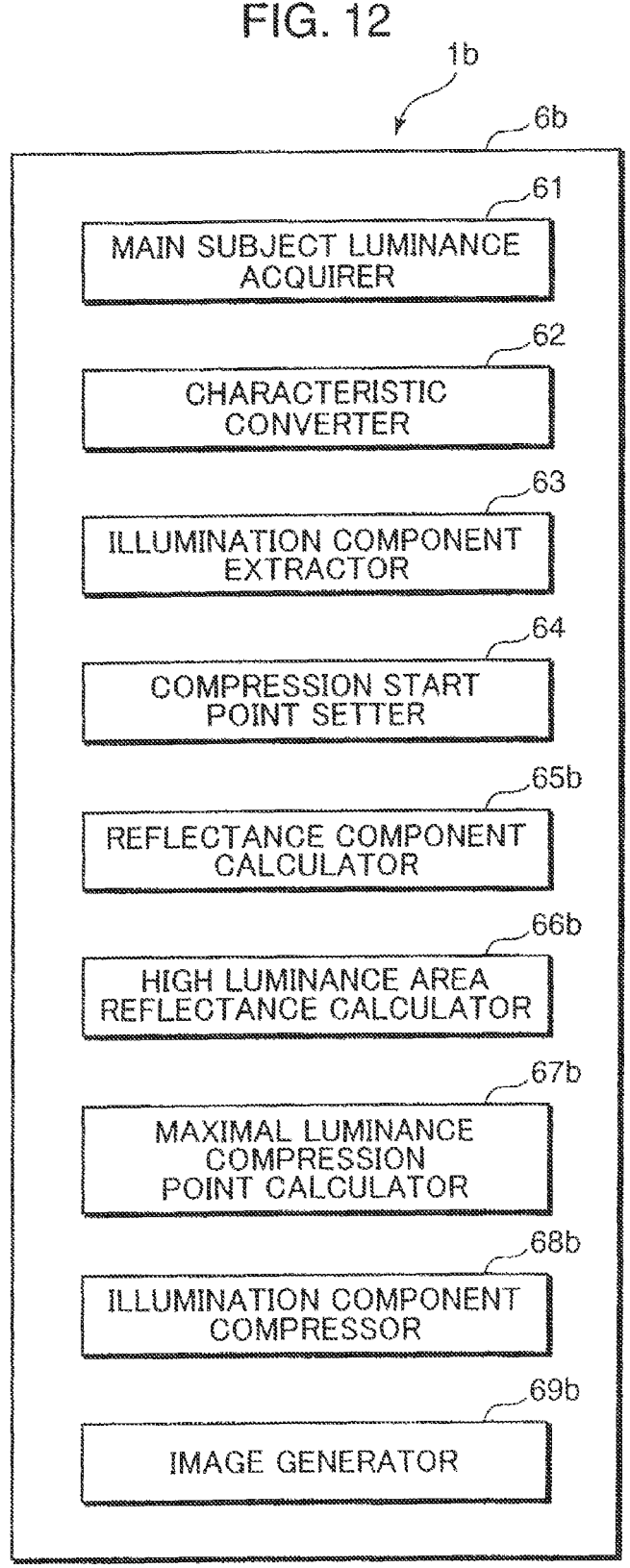
FIG. 12 is a block diagram showing functional parts of an image processing section of a digital camera, which is an example of an image sensing apparatus according to a third embodiment of the invention.

FIG. 12 is a block diagram showing functional parts of an image processing section 6b in the digital camera 1b. As shown in FIG. 12, the image processing section 6b is different from the image processing section 6 in the first embodiment in a reflectance component calculator 65b, a high luminance area reflectance calculator 66b, a maximal luminance compression point calculator 67b, an illumination component compressor 68b, and an image generator 69b. The arrangement of the other functional parts in the third embodiment is substantially the same as the arrangement of the other functional parts in the first embodiment, and accordingly, description thereof will be omitted herein.

The reflectance component calculator 65b calculates i.e. extracts a reflectance component "R" out of an image "It". The reflectance component "R" is calculated by the following mathematical expression (9) using the illumination component "L". The expression (9) is derived from the expression (4).

$$R = It/L \quad (9)$$

The high luminance area reflectance calculator 66b calculates a reflectance "Rhi" in a high luminance area i.e. a high luminance portion, using the reflectance component "R" calculated by the reflectance component calculator 65b. Specifically, the high luminance area reflectance calculator 66b calculates a maximal reflectance or an average reflectance, using the reflectance component "R" in the high luminance area where the value of the illumination component "L" is equal to or large than a predetermined threshold "th" (see FIG. 13), as the reflectance "Rhi". This idea is expressed by the following descriptions (a) and (b).

(a) the maximal value of the reflectances of pixels where the value of the illumination component is equal to or larger than the threshold value "th" is defined as the reflectance "Rhi".

(b) the average value of the reflectances of pixels where the value of the illumination component is equal to or larger than the threshold value "th" is defined as the reflectance "Rhi".

It should be noted that the threshold value "th" is a value that satisfies the requirement: the reflectance component having the pixel value over the maximal output value "Omax", e.g., the reflectance component in the pixel portion indicated by 931 in the conventional art (see FIG. 20), is included in the reflectance component in a luminance area where the value of the illumination component "L" is equal to or larger than the threshold value "th". The threshold value "th" may be a fixed value, or may be set variable in accordance with information relating to a predetermined criterion, each time a photographic image is obtained. Also, the average reflectance may be calculated by simple-averaging the entirety of the reflectance component in the luminance area where the value of the illumination component "L" is equal to or larger than the threshold value "th", or may be an average value obtained by an averaging method other than the above.

Further alternatively, the high luminance area reflectance calculator 66b may calculate the reflectance "Rhi" according to the following method (c) or (d).

(c) The reflectance "Rhi" may be a maximal value of reflectances obtained by multiplication by a weight corresponding to the distance from the main subject image to the pixel where the value of the illumination component "L" is equal to or larger than the threshold value "th". Specifically, a maximal value of reflectances obtained by multiplying the reflectances of the pixels in a high luminance area where the value of the illumination component "L" is equal to or larger than the threshold value "th", by a weight "d" corresponding to the distance from the respective pixels to the position of the main subject image in a photographic image, is defined as the reflectance "Rhi". The weight "d" is described by the following mathematical expression (9.1).

$$d = 1 - \frac{\sqrt{(w/2 - x)^2 + (h/2 - y)^2}}{\sqrt{(w/2)^2 + (h/2)^2}} \quad (9.1)$$

The expression (9.1) describing the weight "d" is defined based on the conditions that the main subject image is located at a center of the photographic image, and the photographic image has "w" pixels in horizontal direction and "h" pixels in vertical direction. The weight "d" is increased as the distance from the pixel to the center of the image i.e. the position of the main subject image is decreased, and on the contrary, is decreased as the distance from the pixel to the center of the image is increased.

(d) The reflectance "Rhi" may be a weighted average value of reflectances obtained by: multiplying the reflectances of the pixels where the value of the illumination component "L" is equal to or larger than the threshold value "th", by the weight "d" corresponding to the distance from the respective pixels to the main subject image; and by averaging the weighted reflectances.

Calculation of the reflectance "Rhi" using the method (c) or (d) is advantageous in preventing saturation of the luminance value of a pixel image having a high luminance and a high reflectance near the main subject image, such as an object image or a subject image, which may be caused by the following. A shorter distance between the high-luminance and high-reflectance pixel image, and the main subject image in the photographic image increases the reflectance "Rhi" in the pixel image, in other words, increases the weight "d", which resultantly increases the compression ratio which is varied in accordance with the reflectance "Rhi".

The maximal luminance compression point calculator 67b calculates i.e. sets a maximal luminance compression point "Md" indicated by 606 based on the reflectance "Rhi" calculated by the high luminance area reflectance calculator 66b. The maximal luminance compression point "Md" is set in such a manner that the reflectance component "R" in the high luminance area does not exceed the output maximal value "Omax" after dynamic range compression implemented by the illumination component compressor 68b, which will be described later. Specifically, the maximal luminance compression point "Md" is a point (Xmax, L'max), which corresponds to an illumination compression level "L'max" at a maximal luminance "Xmax". With use of the maximal luminance compression point "Md", the illumination component "L" having a dynamic range between 0 and Ymax i.e. a maximal value of the linear characteristic is allowed to have a dynamic range from 0 to L'max after the dynamic range compression. The point "Md" has a Y-coordinate level i.e. an output level lower than the maximal output value "Omax", as compared with the point "M'". Specifically, the maximal luminance compression point calculator 67b calculates the value of "L'max" using the following mathematical expression (10.3) based on the reflectance "Rhi" and the maximal output value "Omax". The expression (10.3) is derived from the mathematical expression (10.1) describing that an image "I'" to be described later has a value equal to or smaller than "Omax"; and the mathematical expression (10.2) describing that the image "I'" in the expression (10.1) is obtained by multiplying the illumination component "L'max" by the reflectance "Rhi".

$$I' \leq Omax \quad (10.1)$$

$$L'max * Rhi \leq Omax \quad (10.2)$$

$$L'max \leq Omax/Rhi \quad (10.3)$$

The illumination component compressor 68b performs dynamic range compression for the illumination component "L" extracted out of the image "It" by the illumination component extractor 63. Specifically, the illumination component compressor 68b determines a dynamic range compression ratio "c", which will be described later, in accordance with the reflectance "Rhi". In other words, the illumination component compressor 68b determines the compression ratio "c" in such a manner that an increased reflectance "Rhi" increases the compression ratio "c", and performs dynamic range compression for the illumination component "L" based on the determined compression ratio "c". By implementing the dynamic range compression by the illumination component compressor 68b, the illumination component "L" indicated by 310 turns into an illumination component indicated by 620. The illumination component "L'" is given by the following mathematical expression (11).

$$L' = \exp(\log(L) * c) * n \quad (11)$$

where "c" is a dynamic range compression ratio, and "n" is a normalization term.

Figure 13:
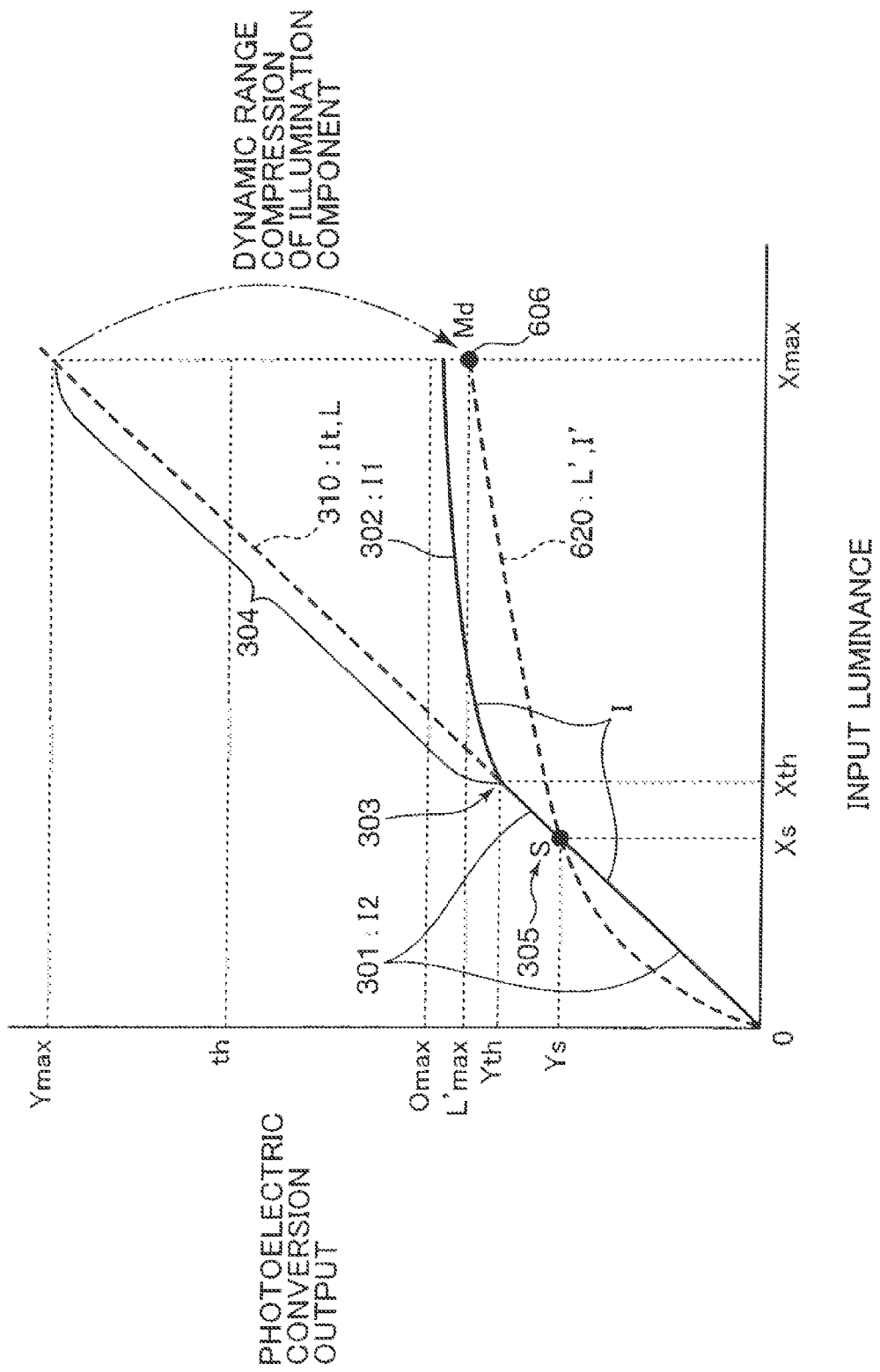
FIG. 13 is a graph showing a dodging processing by a gradation conversion processing in the image processing section shown in FIG. 12.

As shown in FIG. 13, the dynamic range compression of the illumination component "L" by the illumination component compressor 68b compresses the illumination component image having the dynamic range between 0 to Ymax so that the illumination component image after the dynamic range compression has the dynamic range between 0 to L'max, which is equal to or smaller than "Omax". Similarly to the first embodiment, as mentioned above, "Omax" is a maximal output value of a predetermined image outputting device, e.g. a maximal output value or a maximal pixel value of the image sensor 3. "Omax" has a gradation value "255" in the case of an 8-bit image, for instance. The function "L'", described by the expression (11), which represents the illumination component after the dynamic range compression, passes two points, i.e., a compression start point "S" (Xs, Ys), and the maximal luminance compression point "Md" (Xmax, L'max). Accordingly, the two unknowns "c" and "n" in the expression (11) can be calculated based on simultaneous equations obtained by substituting the coordinate values at the points "S" and "Md", respectively.

The compression start point "S" is defined in the dynamic range compression for the illumination component "L" so as to prevent the main subject luminance from the dynamic range compression, as mentioned above. In view of this, whereas the illumination component compressor 68b uses the compression characteristic indicated by 320 in the dynamic range compression for the illumination component the illumination component compressor 68b uses the original image "I", as an output value, in an area where the value of the illumination component "L" is lower than the compression start level "Ys", without using the illumination component "L'" obtained based on the compression characteristic indicated by 320.

The image generator 69b generates the new image "I'" after the dodging processing out of the original image "I" by implementing the mathematical expression (12), using the illumination component "L'" obtained by the illumination component compressor 68b, and the reflectance component "R" obtained by the reflectance component calculator 65b.

$$I' = L' * R \quad (12)$$

In FIG. 13, the image "I'" is obtained by multiplying the entirety of the illumination component "L'" indicated by 620 by the reflectance component "R".

Figure 14:
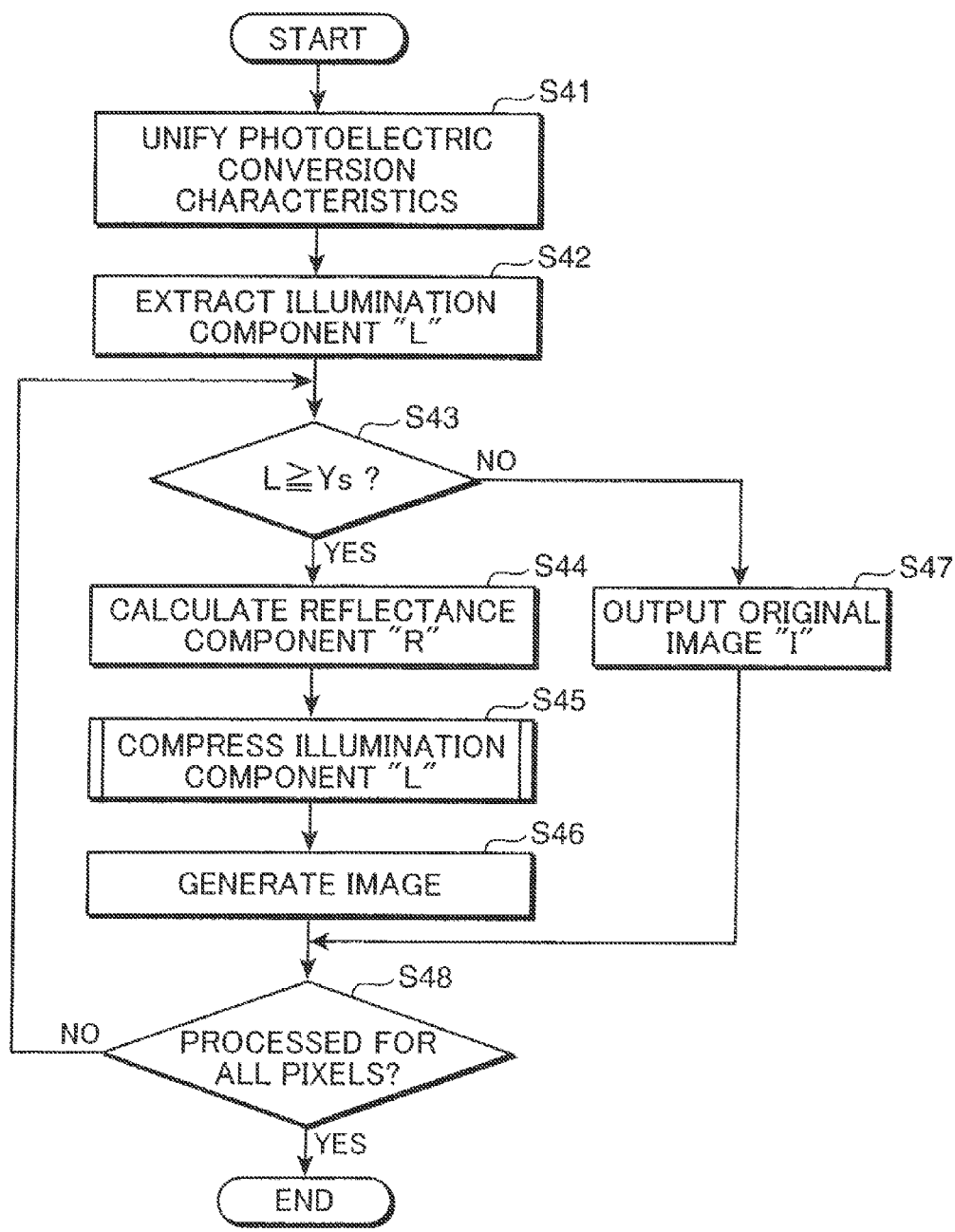
FIG. 14 is a flowchart showing an example of an operation concerning a dodging processing to be executed by the digital camera in the third embodiment.

FIG. 14 is a flowchart showing an example of an operation concerning the dodging processing to be executed by the digital camera 1b in the third embodiment. First, the characteristic converter 62 unifies characteristics into a linear characteristic so as to obtain the image "It" (in Step S41). Then, the illumination component extractor 63 extracts the illumination component "L" out of the image "It" by a filter processing, using an edge keeping filter i.e. a non-linear filter. The illumination component extraction is carried out simultaneously for all the pixels of the image "It" (in Step S42). Thereafter, the compression start point setter 64 sets the compression start level "Ys", and if the illumination compression compressor 68b judges that the illumination component "L" has a luminance level equal to or larger than the compression start level "Ys" (YES in Step S43), the reflectance component calculator 65b calculates the reflectance component "R" (in Step S44). Then, the illumination component compressor 68b performs dynamic range compression for the illumination component "L" based on the information relating to the compression start point "S" corresponding to the compression start level "Ys", and the maximal luminance compression point "Md" corresponding to the illumination compression level "L'max" to obtain the illumination component "L'" (in Step S45). The operation flow in Step S45 will be described in detail referring to FIG. 15. Then, the image "I'" is generated based on the reflectance component "R" and the illumination component "L'" obtained in Steps S44 and S45, for output (in Step S46). If the illumination component "L" is judged to have a luminance level lower than the compression start level "Ys" in Step S43 (NO in Step S43), the original image "I" is selected for output (in Step S47). The operations from Steps S43 through S47 are sequentially executed for each pixel of the illumination component "L". After the operations from Steps S43 through S47 are completed for all the pixels (YES in Step S48), the flow is ended. If, on the other hand, the operations from Steps S43 through S47 are not completed for all the pixels (NO in Step S48), the flow returns to Step S43 to cyclically repeat the operations from Steps S43 through S47 until the operations from Steps S43 through S47 are completed for all the pixels.

Figure 15:
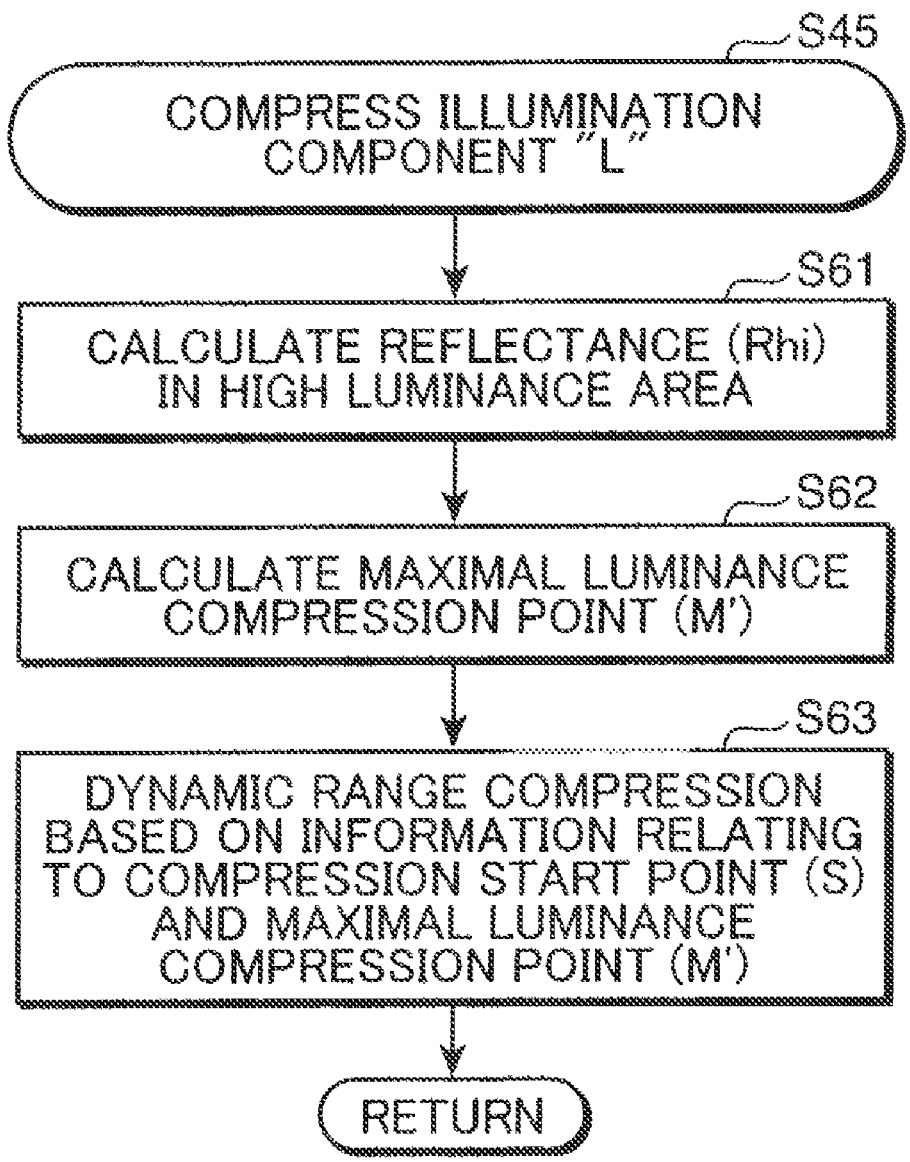
FIG. 15 is a flowchart showing an example of detailed operations of a dynamic range compression processing in Step S45 shown in FIG. 14.

FIG. 15 is a flowchart showing an example of a detailed operation of the dynamic range compression processing in Step S45. Regarding the dynamic range compression processing in Step S45, first, the high luminance area reflectance calculator 66b calculates the reflectance "Rhi" i.e. a maximal reflectance or an average reflectance in the high luminance portion, using the reflectance component "R" calculated by the reflectance component calculator 65b (in Step S61). Then, the maximal luminance compression point calculator 67b calculates the maximal luminance compression point "Md" based on the reflectance "Rhi" calculated by the high luminance area reflectance calculator 66b. Specifically, the maximal luminance compression point calculator 67b calculates the illumination compression level "L'max" based on the reflectance "Rhi" and the maximal output value "Omax", using the expression (10.3) (in Step S62). Thereafter, the illumination component compressor 68b performs dynamic range compression for the illumination component "L" based on the information relating to the compression start point "S" corresponding to the compression start level "Ys" and the maximal luminance compression point "Md" corresponding to the illumination compression level "L'max" to acquire the illumination component "L'". Specifically, the illumination component compressor 68b calculates the dynamic range compression ratio "c" that allows the function "L'" of the illumination component described by the expression (11) to pass the compression start point "S" (Xs, Ys) and the maximal luminance compression point "Md" (Xmax, L'max), and performs dynamic range compression with the dynamic range compression ratio "c" (in Step S63).

To summarize the embodiments of the invention, in the image sensing apparatus according to the first and second embodiments of the invention, i.e. in the digital camera 1, 1a, the image sensor 3 senses light representing a subject image i.e. a light image; the illumination component extractor 63 (63a) as a first component extractor extracts the illumination component "L" as a first component, out of the photographic image as an original image "I" or an image "It", which is obtained by the image sensor 3; and the reflectance component calculator 66 as a second component extractor calculates i.e. extracts the reflectance component "R" as a second component, which has the frequency higher than the frequency of the illumination component "L", out of the photographic image. The compression start point setter 64 sets the predetermined compression start level "Ys" as a level value for the illumination component "L"; the illumination component compressor 65 compresses the dynamic range of the illumination component "L" in the area where the value of the illumination component "L" is equal to or larger than the compression start level "Ys", namely, performs dynamic range compression for the illumination component "L"; and the image generator 67 generates the new image as an image "I'", based on the illumination component "L'" after the dynamic range compression i.e. a compressed illumination component or a compressed first component, and the reflectance component "R". This arrangement enables to set the compression start level "Ys" for the illumination component "L", and to determine the area where dynamic range compression for the illumination component "L" is performed based on the set compression start level "Ys". For instance, setting the compression start level "Ys" equal to or larger than the main subject luminance enables to prevent dynamic range compression of the illumination component "L" in the main subject image, thereby preventing contrast lowering in a dodging processing. Also, this arrangement enables to keep the area where the value of the illumination component "L" is smaller than the compression start level "Ys" from dynamic range compression, for instance, enables to select the original image "I" in the area where the value of the illumination component "L" is smaller than the compression start level "Ys". This enables to shorten a processing time in the dodging processing. In this way, the arrangement prevents the pixel value of the image "I'" after the dodging processing from exceeding the pixel value of the original image "I", which enables to perform a dodging processing without degrading the S/N ratio.

Also, the compression start point setter 64 sets the main subject luminance representing the luminance of the main subject image, or a value larger than the main subject luminance, as the compression start level "Ys". This allows for selective dynamic range compression in the area where the value of the illumination component "L" is equal to or larger than the main subject luminance, as the compression start level "Ys", in the dodging processing. This securely prevents contrast lowering of the main subject image due to compression of the dynamic range of the illumination component "L" in the main subject image.

Further, the compression start point setter 64 sets the compression start level "Ys" depending on the main subject image. This facilitates a dodging processing depending on the main subject image or the subject image. In other words, the arrangement improves latitude in a dodging processing in which dynamic range compression of the illumination component "L" in the main subject image is refrained.

Furthermore, the compression start point setter 64 sets the luminance having a smaller frequence in the predetermined luminance histogram, as the compression start level "Ys". This enables to avoid compression in a pixel portion where the frequence in the luminance histogram is large, which enables to suppress variation in gradation characteristic in the dodging processing.

The image sensor 3 is an image sensor for generating an electrical signal commensurate with an amount of incident light, and having a photoelectric conversion characteristic comprising a linear characteristic that the electrical signal is linearly converted commensurate with the incident light amount for output, and a logarithmic characteristic that the electrical signal is logarithmically converted commensurate with the incident light amount for output. The compression start point setter 64 sets the compression start level "Ys" depending on the inflection point between the linear characteristic and the logarithmic characteristic. This arrangement facilitates setting of the compression start level "Ys" in the image sensor 3 i.e. a linear-logarithmic sensor.

The illumination component compressor 65 determines the compression parameter, i.e. the dynamic range compression ratio "c", for use in compressing the dynamic range of the illumination component, based on the information relating to the compression start level "Ys" and the sensing dynamic range of the image sensor 3 i.e. the dynamic range between 0 to Omax shown in FIG. 3. This enables to prevent dynamic range compression for the illumination component "L" in the main subject image based on the information relating to the compression start level "Ys", and to set the compression parameter, as the first compression parameter, which allows the illumination component "L'" after the dynamic range compression to have the range equal to or narrower than the sensing dynamic range, for instance, based on the information relating to the sensing dynamic range. Consequently, a high-quality image "I'" with no or less contrast lowering of the main subject image, and having a sufficiently wide dynamic range is producible.

The illumination component compressor 65 calculates the first compression parameter based on the conditions that the first compression characteristic (see the function curve showing the illumination component "L'" indicated by 320), in the form of a characteristic function, representing the illumination component "L'" after the dynamic range compression passes at least the two points, namely, the coordinate point concerning the compression start level "Ys" i.e. the compression start point S (Xs, Ys), and the coordinate point of the maximal output value in the sensing dynamic range of the image sensor 3 i.e. the compression level point "M'" (Xmax, Omax). This enables to calculate the first compression parameter with an easy approach of solving the function that passes the compression start point "S" and the compression level point "M'", thereby realizing a high-speed dodging processing.

According to another aspect of the invention, the provisional illumination image creator 68 creates the provisional illumination image as an evaluation image, based on the photographic image, as the original image "I" or the image "It", prior to extraction of the illumination component "L". The illumination component extraction area calculator 69 sets the illumination component extraction area based on the provisional illumination image. The illumination component extractor 63a extracts the illumination component "L" in the illumination component extraction area, out of the photographic image, so that the value of the illumination component "L" in the illumination component extraction area is equal to or larger than the compression start level "Ys", for instance. This arrangement eliminates an operation of selecting the original image "I" in the area where the value of the illumination component "L" is lower than the compression start level "Ys" to prevent dynamic range compression for the illumination component "L" in the main subject image after the extraction of the illumination component "L" out of the entirety of the illumination component in the dodging processing. Such an operation requires an additional time for extraction of the illumination component "L" in the area where the value of the illumination component "L" is lower than the compression start level "Ys". Generally, a relatively long processing time is required for extraction of the illumination component "L". Thus, the arrangement enables to extract the illumination component "L" merely in the area where the value of the illumination component "L" is equal to or larger than the compression start level "Ys", and to perform dynamic range compression of the extracted illumination component "L", which shortens a time required for the dodging processing.

Also, the provisional illumination image creator 68 creates the provisional illumination image based on the filter processing for the photographic image, using the linear filter e.g. the LPF. This enables to create the provisional illumination image easily and in a shortened time, using the linear filter capable of performing high-speed filter processing, as compared with using a non-linear filter such as an edge keeping filter.

The illumination component extraction area calculator 69 sets the area where the value of the illumination component "L" is equal to or smaller than the compression start level "Ys", and is equal to or larger than the predetermined threshold value "th", as the illumination component extraction area. This enables to define the illumination component extraction area having e.g. the margin indicated by the range 309 corresponding to the value difference between the compression start level "Ys" and the threshold value "th", which is provided to prevent erroneous judgment as to whether dynamic range compression is necessary in setting the illumination component extraction area and in actual extraction of the illumination component. Thus, the arrangement enables to accurately perform the dodging processing using the provisional illumination image.

The image processing method to which the image sensing apparatus according to the first and second embodiments i.e. the digital camera 1, 1a is applied comprises: the first step of sensing light representing a subject image by the image sensor 3; the second step of extracting, by the illumination component extractor 63, 63a, the illumination component "L" having the predetermined frequency, out of the photographic image as the original image "I" or the image "it", which is obtained by the image sensor 3; and the third step of calculating i.e. extracting, by the reflectance component calculator 66, the reflectance component "R" having the frequency higher than the frequency of the illumination component "L" out of the photographic image. The method further comprises: the fourth step of compressing, by the illumination component compressor 65, the dynamic range of the illumination component "L" extracted by the illumination component extractor 63, 63a; and the fifth step of generating, by the image generator 67, the new image as the image "I'", based on the illumination component "L'" as the compressed illumination component, which is obtained by compressing the dynamic range of the illumination component "L" by the illumination component compressor 65, and the reflectance component "R" calculated by the reflectance component calculator 66. The method further comprises the sixth step of setting, by the compression start point setter 64, the compression start level "Ys" for the illumination component "L". The fourth step is a compression step in which the illumination component compressor 65 compresses the dynamic range of the illumination component "L" in the area where the value of the illumination component "L" is equal to or larger than the compression start level "Ys".

According to the image processing method comprising the first through the sixth steps, the compression start level "Ys" for the illumination component "L" is set, and the area for dynamic range compression of the illumination component "L" is determined in accordance with the set compression start level "Ys". This arrangement enables to prevent compressing the dynamic range of the illumination component "L" in the main subject image by setting the compression start level "Ys" equal to or larger than the main subject luminance, for instance, thereby preventing contrast lowering of the main subject image in the dodging processing. Also, this arrangement enables to prevent dynamic range compression of the illumination component "L" in the area where the value of the illumination component "L" is smaller than the compression start level "Ys", in other words, to select the original image "I" in the area where the value of the illumination component "L" is smaller than the compression start level "Ys". This enables to shorten the time required for the dodging processing. This arrangement prevents the pixel value of the image "I'" after the dodging processing from exceeding the pixel value of the original image "I", which enables to perform a dodging processing without degrading the S/N ratio.

Also, in the sixth step, the compression start point setter 64 sets the main subject luminance representing the luminance of the main subject image, or a value larger than the main subject luminance, as the compression start level "Ys". This allows for selective dynamic range compression in the area where the value of the illumination component "L" is equal to or larger than the main subject luminance, as the compression start level "Ys" in the dodging processing. This securely prevents contrast lowering of the main subject image due to compression of the dynamic range of the illumination component "L" in the main subject image.

In the image sensing apparatus directed to the third embodiment of the invention, i.e. in the digital camera 1b, the high luminance area reflectance calculator 66b as a compression correction coefficient calculator calculates the reflectance "Rhi" as a compression correction coefficient in the high luminance area, using the reflectance component "R" as the second component, which is extracted by the reflectance component calculator 65b as the second component extractor. The reflectance "Rhi" is a correction coefficient for use in compressing the illumination component "L" as the first component. The illumination component compressor 68b determines the compression ratio i.e. the dynamic range compression ratio "c" in such a manner that the larger reflectance "Rhi" increases the compression ratio, based on the reflectance "Rhi" calculated by the high luminance area reflector calculator 66b, and compresses the dynamic range of the extracted illumination component "L" based on the determined compression ratio. The image generator 69b generates the new image as the image "I'" based on the illumination component "L'" as the compressed illumination component or the compressed first component, which is obtained by compressing the dynamic range of the extracted illumination component "L", and the reflectance component "R". This allows for compression of the dynamic range of the illumination component "L", with the compression ratio having a feature that the larger reflectance "Rhi" increases the compression ratio. This allows for compression of the dynamic range of the illumination component "L" in such a manner that the reflectance component "R" does not exceed the maximal output value "Omax" of a predetermined image outputting device e.g. a display device. This prevents contrast lowering in the dodging processing even if a subject image having a large reflectance exists in the high luminance area of the photographic image.

The illumination component compressor 65b determines the compression ratio so that the output value of the image which is generated based on the maximally compressed illumination component L'max in the illumination component "L'", and the reflectance "Rhi" e.g. the value expressed by the equation: L'max*Rhi, is equal to or smaller than the maximal output value "Omax" of the predetermined image outputting device e.g. the display device. This facilitates acquiring an intended compression ratio, based on a relational expression describing that the output value of the image generated based on the maximally compressed illumination component "L'max" and the reflectance "Rhi" is equal to or smaller than the maximal output value of the predetermined image outputting device e.g. a relation described by the formula: L'max*Rhi≦Omax.

Also, the high luminance area reflectance calculator 66b calculates the maximal reflectance or the average reflectance in the area where the value of the illumination component "L" is equal to or larger than the predetermined threshold value "th", using the reflectance component "R" as the reflectance "Rhi". This facilitates acquiring the reflectance "Rhi" by the method of calculating the maximal reflectance or the average reflectance in the area where the value of the illumination component "L" is equal to or larger than the threshold value "th".

The high luminance area reflectance calculator 66b calculates the reflectance "Rhi" depending on the distance from the main subject image in the photographic image to the pixel where the value of the illumination component "L" is equal to or larger than the threshold value "th", using the reflectance component "R". This prevents saturation of the luminance of a high-luminance and high-reflectance pixel image near the main subject image due to dynamic range compression by the illumination component compressor 65.

The image processing method directed to the third embodiment of the invention comprises: the first step of sensing light representing a subject image by the image sensor 3; the second step of extracting, by the illumination component extractor 63, the illumination component having the predetermined frequency out of the photographic image as the original image "I" or the image "It", which is obtained by the image sensor 3; the third step of extracting i.e. calculating, by the reflectance component calculator 65b, the reflectance component "R" having the frequency higher than the frequency of the illumination component "L" out of the photographic image; and the sixth step of calculating, by the high luminance area reflectance calculator 66b, the reflectance "Rhi" in the high luminance area as the compression correction coefficient, using the reflectance component "R" extracted by the reflectance component calculator 65b. The method further comprises the fourth step of determining, by the illumination component compressor 68b, the compression ratio i.e. the dynamic range compression ratio "c" in such a manner that the larger reflectance "Rhi" increases the compression ratio, based on the reflectance "Rhi" calculated by the high luminance area reflectance calculator 66b, and of compressing the dynamic range of the extracted illumination component "L" based on the determined compression ratio. The method further comprises the fifth step of generating, by the image generator 69b, the new image as the image "I'", based on the illumination component "L'" after the dynamic range compression i.e. the compressed illumination component, and the reflectance component "R". This arrangement enables to compress the dynamic range of the illumination component "L" with the compression ratio having the feature that the larger reflectance "Rhi" increases the compression ratio. This allows for dynamic range compression for the illumination component "L" so that the reflectance component "R" does not exceed the maximal output value "Omax" of the predetermined image outputting device. Thus, the arrangement prevents contrast lowering in the dodging processing even if a subject image having a large reflectance exists in the high luminance area of the photographic image.

The following modifications may be applied to the embodiments of the invention.

(A) The photographic image i.e. the original image handled in the dodging processing may be the one other than the linear-logarithmic image, for instance, may be an image having a wide dynamic range which is created based on plural images photographed with different shutter speeds or different aperture values, or a knee-processed image which is a compressed image obtained by multiplying merely an output value in a bright image portion i.e. a high luminance area, by a predetermined gain.

(B) In the first and the third embodiments, after the dynamic range compression for the entirety of the illumination component "L", the original image "I" is used in the area where the value of the illumination component "L" is smaller than the compression start level "Ys". Alternatively, dynamic range compression for the illumination component "L" may be performed merely in the area where the value of the illumination component "L" is equal to or larger than the compression start level "Ys", in other words, dynamic range compression for the illumination component "L" may be undone in the area where the value of the illumination component "L" is smaller than the compression start level "Ys". The modified method uses the original image "I" corresponding to a range indicated by 308, as the output value itself, in the area where the value of the illumination component "L" is smaller than the compression start level "Ys".

(C) In the first, the second, and the third embodiments, the dodging processing i.e. the dynamic range compression for the photographic image is performed by the image processing section 6, 6a, 6b in the digital camera 1, 1a, 1b. Alternatively, the dodging processing may be executed by a predetermined processor provided outside of the digital camera 1. Specifically, the dodging processing may be performed in a predetermined host processor equipped with a user interface, such as a personal computer (PC) or a personal digital assistant (PDA), which is so configured as to transmit information, for instance, by direct connection to the digital camera 1, 1a, 1b via a wire, or network-connection via a wireless local area network (LAN), using a USB or the like; or using a storage medium such as a memory card.

(D) In the first, the second, and the third embodiments, the dodging processing uses the reflectance component and the illumination component. Alternatively, the invention may use a high-frequency component and a low-frequency component. Generally, a reflectance component is obtained by dividing an image by an illumination component, and a high-frequency component is obtained by subtracting a low-frequency component from an image. Specifically, in the image processing method using the reflectance component, the illumination component "L" is obtained based on the original image "I", the reflectance component R(=I/L) is obtained using the illumination component "L", and the output image i.e. the image "I'" is obtained by integration of the reflectance component "R", and the illumination component "L'" which is obtained by dynamic range compression of the illumination component "L". On the other hand, the method using the high-frequency component comprises: obtaining a low-frequency component (also called as "base (B)") out of the original image "I"; subtracting the low-frequency component "B" out of the original image "I" to obtain a high-frequency component (also called as "detail (D)"), namely, performing the equation: D=I-B; and adding the high-frequency component (D), and a low-frequency component "L'" (expressed by the same symbol as the illumination component "L'") which is obtained by performing dynamic range compression of the low-frequency component (B) so as to obtain an output image "I'", which is expressed by the same symbol as the output image "I'".

The illumination component is substantially identical to the low-frequency component. Therefore, similarly to the illumination component, the low-frequency component can be extracted out of a photographic image, using an edge keeping filter i.e. a non-linear filter. Also, dynamic range compression for the low-frequency component by a dodging processing using the high-frequency component can be performed in the similar manner as the dynamic range compression for the illumination component using the reflectance component in the foregoing embodiments. The algorithms used in the respective embodiments can be applied both to the dynamic range compression of the illumination component and the dynamic range compression of the low-frequency component. Therefore, the dodging processing using the high-frequency component or the low-frequency component can be applied to the first, the second, and the third embodiments by substituting the high-frequency component for the reflectance component, and substituting the low-frequency component for the illumination component, in other words, by substituting following mathematical expression (7') for the expression (7) or (9), and substituting the following mathematical expression (8') for the expression (8) or (12), i.e. by allowing the main controller 8 and the respective calculation functioning parts of the image processing section 6, 6a, 6b to compute the low-frequency component and the high-frequency component in place of computing the illumination component and the reflectance component.

$$R = It - L \tag{7'}$$

where "R" is a high-frequency component, and "L" is a low-frequency component.

$$I' = L' + R \tag{8'}$$

where "R" is a high-frequency component, and "L'" is a low-frequency component after dynamic range compression.

In the modification (D), substantially the same effect as the foregoing embodiments using the reflectance component and the illumination component can be obtained. The low-frequency component is extracted out of the photographic image, using the edge keeping filter. Accordingly, the extraction of the low-frequency component out of the photographic image can be performed precisely. The above idea means that the reflectance component has a higher frequency than the frequency of the illumination component. Although actually there is a case that a part of the illumination component has a frequency higher than the frequency of the reflectance component, the specification and claims describe the embodiments and modifications of the invention based on a premise that the reflectance component generally has a frequency higher than the frequency of the illumination component, including the above case.

Figure 8:
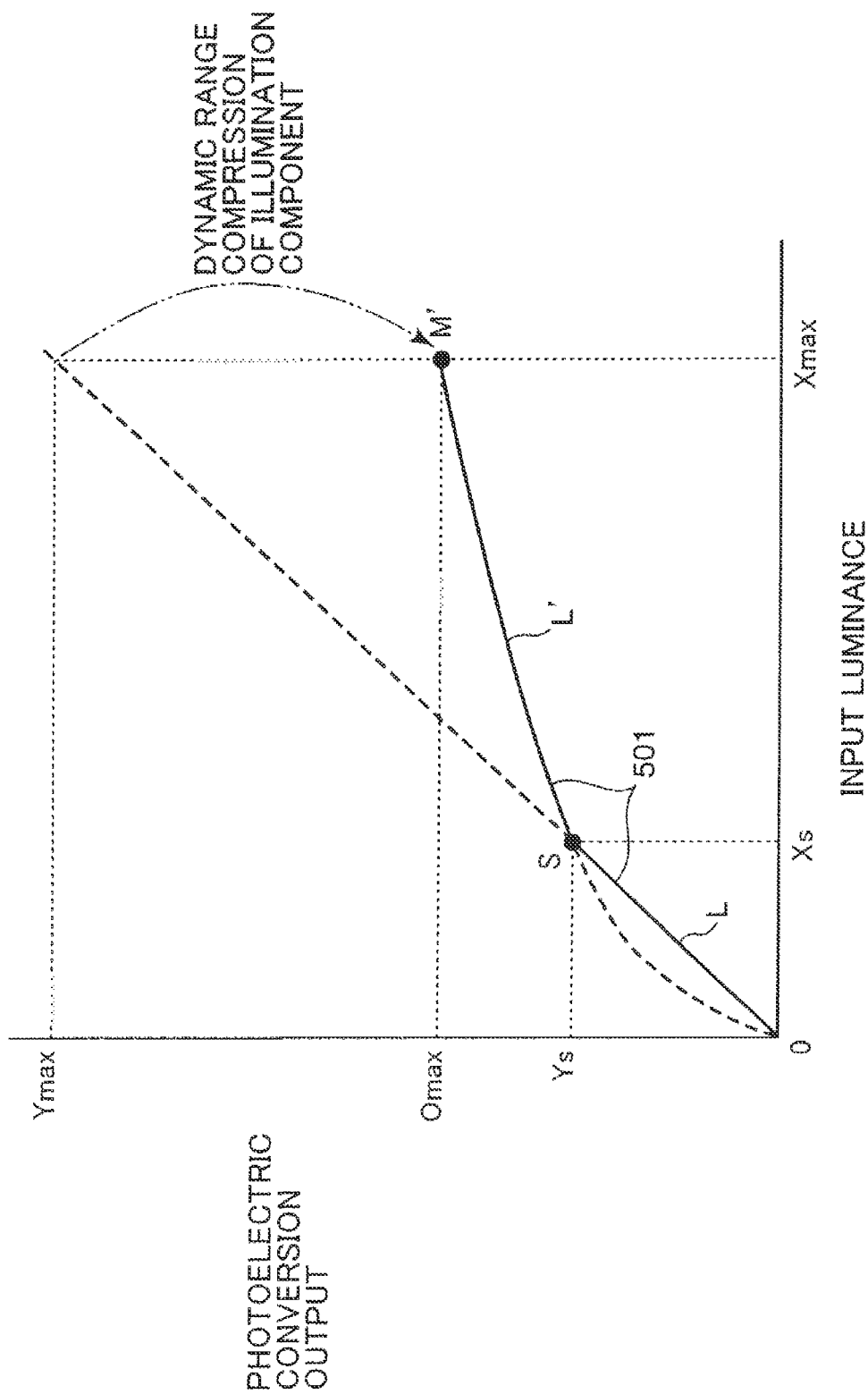
Figure 9:
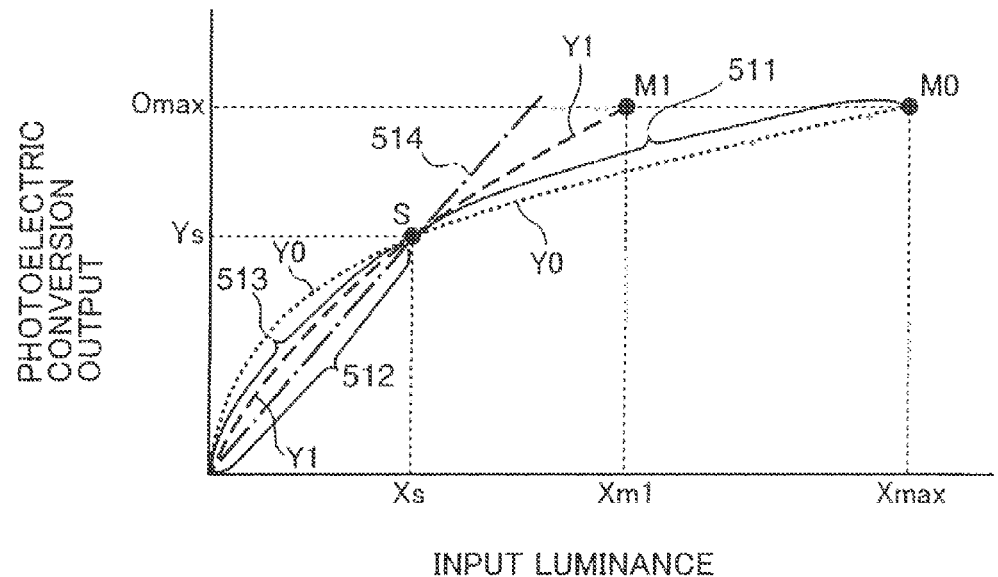

(E) By implementing the image processing in the first embodiment, as shown in FIG. 8, a compression characteristic 501 of the illumination component comprising the characteristic having the range indicated by 308 i.e. the illumination component "L" of the original image "I", and the compression characteristic 320 i.e. the compressed illumination component "L'" in FIG. 3 is obtained. Particularly, in the case where the dynamic range of the image is wide, the image quality is sharply changed at the compression start point "S". This may cause a defected image such as a pseudo outline in a sensed or captured image. In view of this, as shown in FIG. 9, dynamic range compression may be performed so that the illumination component "L" (see FIG. 3) indicated by 310 comprises a compression characteristic Y0 and a compression characteristic Y1. In an actual compression processing, the illumination component compressor 65 performs a processing based on computation formulae including the following mathematical expressions (13) and (14) so that an area where the value of the illumination component "L" is equal to or larger than the compression start level "Ys" has the compression characteristic Y0, and that an area where the value of the illumination component "L" is smaller than the compression start level "Ys" has the compression characteristic Y1 after dynamic range compression, with the compression start point "S" serving as an inflection point.

if $(L>Y_s)$ $$L'=\exp(\log(L)*c0)*n0 \quad (13)$$

else $$L'=\exp(\log(L)*c1)*n1 \quad (14)$$

where "c0, c1", and "n0, n1" respectively represent a dynamic range compression ratio, and a normalization term, as in the case of the expression (6).

The illumination component compressor 65 calculates a compression parameter for the compression characteristic Y0 as the first compression parameter, namely, "c0", "n0" in the expression (13) so that the function described by the expression (13) passes the compression start point "S" (Xs, Ys) and the compression level point "M0" (Xmax, Omax), and calculates a compression parameter for the compression characteristic Y1 as a second compression parameter, namely, "c1", "n1" in the expression (14) so that the function described by the expression (14) passes the compression start point "S" (Xs,Ys) and the compression level point "M1" (Xm1, Omax). The illumination component "L'" described by the expression (13) i.e. the compression characteristic Y0 is identical to the illumination component "L'" indicated by 320, which is described by the expression (6). The compression level point "M0" is identical to the compression level point "M'" indicated by 306. Also, "Xm1" of the compression level point "M1" is a value equal to or smaller than the maximal input luminance Xmax, and is a value given by the equation: Xm1=Max/N where N is a predetermined positive integer. In this way, calculating the compression characteristics Y0 and Y1 using the compression start point "S" as an inflection point makes a difference in output value between a portion of the compression characteristic Y0 indicated by 511, i.e. a compressed illumination component, and a portion of the compression characteristic Y1 indicated by 513 smaller than a difference in output value between the compression characteristic 511, and a portion of a characteristic indicated by 512, i.e. an illumination component of the original image "I". This eliminates a sharp change in compression characteristic near the compression start level "Ys" to thereby suppress image quality variation, which consequently alleviates a luminance change in the photographic image i.e. in the subject image. This arrangement enables to perform a dodging processing with no or less degradation of S/N ratio in the area where the value of the illumination component "L" is smaller than the compression start level "Ys".

The above idea is expressed as follows. Since the compression characteristic Y1 is a characteristic that passes the compression start point "S and the compression level point "M1", it is easy to obtain the compression characteristic Y1 that enables to suppress an image quality change i.e. a characteristic change relative to the compression characteristic Y0, near the compression start level "Ys". It is not necessarily required that the compression characteristic Y1 should pass the compression level point "M1". As shown in FIG. 9, as far as the compression characteristic Y1 has a larger gradient than the gradient of the compression characteristic Y0 in the area where the value of the illumination component "L" is larger than the compression start level "Ys", and passes the compression start point "S" and at least one other point, so that the compression characteristic Y1 having a gradient smaller than the gradient of the linear characteristic 514 representing the illumination component of the original image "I" is obtained, the aforementioned effect is secured.

(F) As described in the modification (E) referring to FIG. 8, in the case where the dynamic range of the image is wide, an image quality is sharply changed at or near the compression start point "S". This may cause a defected image such as a pseudo outline in a sensed or captured image. The drawback may be eliminated by conducting the image processing as recited in the modification (F). Specifically, the illumination component compressor 65 may perform the following processing indicated by the processing steps A through C.

(Step A) creation of lookup table
(Step B) alteration of lookup table created in Step A
(Step C) dynamic range compression of illumination component using altered lookup table created in Step B The following is an example of Steps A, B, and C.

<Processing in Step A>

A lookup table (LUT) describing input/output values is created by a computation processing described by the mathematical expression (15) corresponding to the compression characteristic 501 in FIG. 8. The LUT has "Xmax" as an input value, and "Omax" as an output value, in other words, has a range between 0 to Xmax as an input value, and a range between 0 to Omax as an output value. The LUT is defined as a first LUT.

for ($i$=0 to $X$max) { if ($i<Y_s$)

LUT($i$)=$i$ else $$LUT(i)=\exp(\log(L)*c)*n\} \quad (15)$$

where "Ys" is a compression start level, and "c" and "n" are the values computed in expression (6).

<Processing in Step B>

The first LUT created in Step A is altered into a second LUT by a computation processing described by the following mathematical expression (16). In this step, a moving average in a predetermined range "w" is calculated with respect to the input/output values of the LUT.

for ($i = 0$ to $X max$) \quad (16)

$$\left\{LUT(i) = \sum_{j=0}^{w} LUT(i-j+w/2)/w\right\}$$

<Processing in Step C>

Assuming that an illumination component comprising the illumination components "L" and "L'", which corresponds to the compression characteristic 501 in FIG. 8, is expressed as an illumination component "L1", an illumination component "L2" is calculated by implementing the computation described by the following mathematical expression (17), using the illumination component "L1", and the second LUT created in Step B.

$$L2=LUT(L1) \quad (17)$$

Figure 10:
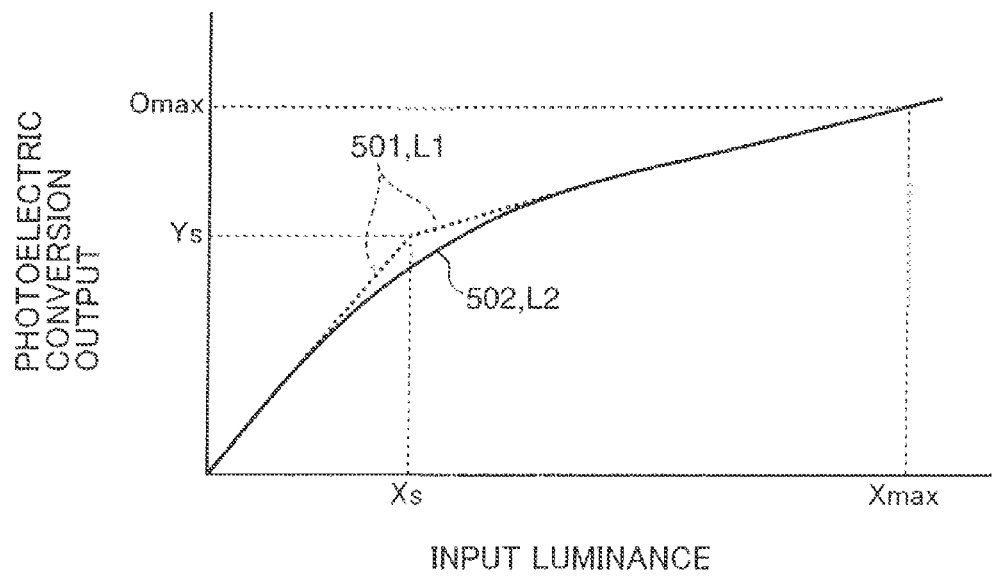

By implementing Steps A through C, the compression characteristic 501 i.e. the illumination component "L" in FIG. 10 is altered into a compression characteristic 502 i.e. the illumination component L2. In this way, the linear characteristic and the logarithmic characteristic are smoothly unified into a compression characteristic without a sharp change in compression characteristic at the compression start point "S", i.e. near the compression start level "Ys". This modification enables to suppress an image quality change i.e. a compression characteristic change near the compression start level "Ys", thereby alleviating a luminance change in the photographic image. The modification enables to perform a dodging processing with no or less degradation of S/N ratio in the area where the value of the illumination component is smaller than the compression start level "Ys". The processing of unifying the different compression characteristics i.e. the linear characteristic and the logarithmic characteristic into a smooth compression characteristic without a sharp change in characteristic between the linear characteristic and the logarithmic characteristic is referred to as "smoothing processing". The smoothing processing is realized by a simplified processing such as the aforementioned moving-average processing. This facilitates alleviation of a luminance change near the compression start level in a shortened time. The modification (F) is applicable to the first, the second, and the third embodiments.

(G) It is preferable to set the compression start level "Ys" as low as possible in order to enhance the contrast in a high luminance area of a linear-logarithmic image. However, as described in the setting of the compression start level "Ys in the first embodiment, if the compression start level "Ys" is made as low as the level of the main subject luminance or the subject luminance, dynamic range compression is performed as well as for the main subject luminance, which may result in gradation non-uniformity of the main subject image, i.e. lower the contrast of the main subject image. If the reflectance of the main subject image i.e. the reflectance component "R" is high, contrast lowering of the main subject image after the dynamic range compression is negligibly small. In view of this, the compression start level may be set variable depending on the magnitude (high or low) of the reflectance of the main subject image in such a manner that a higher reflectance lowers the compression start level "Ys" as the level value, and a lower reflectance sets the compression start level "Ys" at such a level that is free from contrast lowering of the main subject image due to dynamic range compression of the main subject luminance, as mentioned above.

More specifically, the reflectance component calculator 66 calculates a reflectance Rsub in a main subject image area, i.e., a reflectance component (Step a). Then, the compression start point setter 64 calculates the compression start level "Ys" by a computation processing described by the following mathematical expression (18), based on the calculated reflectance Rsub (Step b).

if ($Rsub < R\theta$)

then

Ys=maximal value of main subject luminance else

Figure 11A:
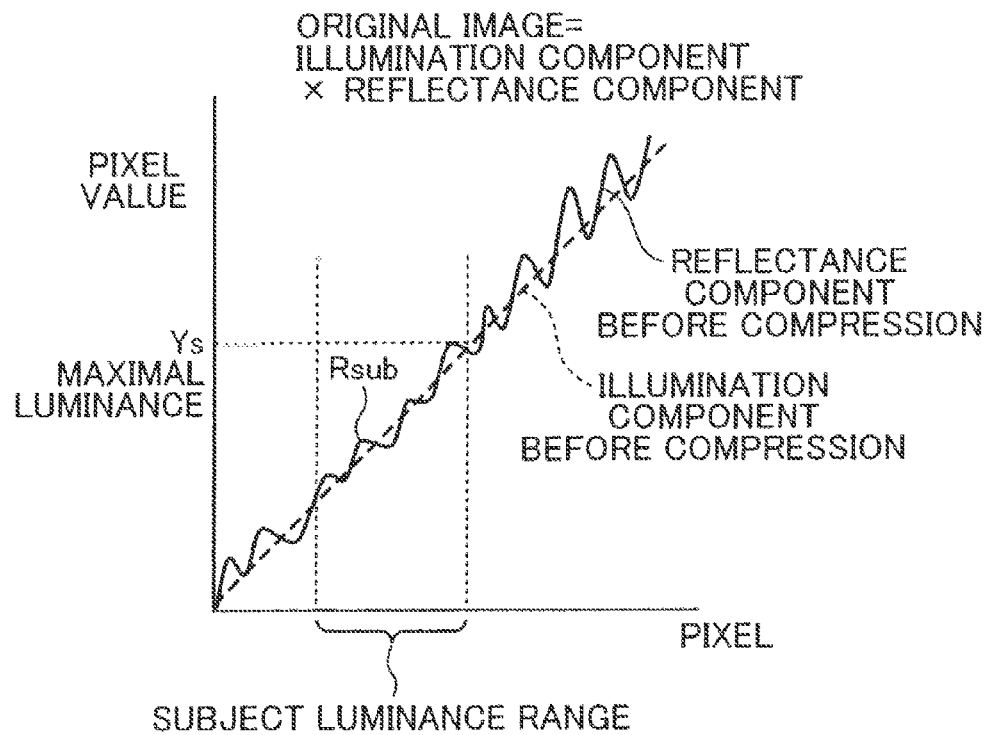
FIG. 11A is a graph showing a dynamic range compression processing in a further modification.
Figure 11B:
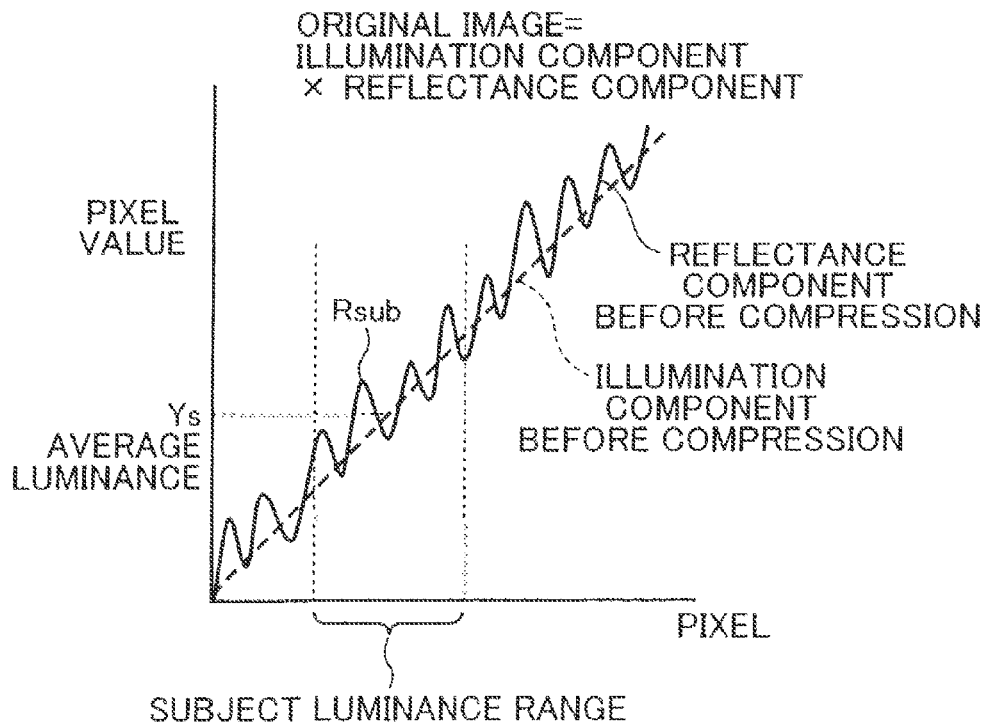

Ys=average value of main subject luminance    (18)

where "$R\theta$" is a predetermined threshold value for judging whether the reflectance Rsub is high. The threshold value "$R\theta$" is stored in the compression start point setter 64 as a fixed value, for instance. The maximal value of the main subject luminance is a maximal luminance in a subject luminance range i.e. a main subject image area shown in FIG. 11A, for instance, and the average value of the main subject luminance is an average luminance obtained by averaging the luminances in a subject luminance range shown in FIG. 11B, for instance. If the reflectance Rsub is low, the maximal luminance is set as the compression start level "Ys", which sets the compression start level "Ys" high. If the reflectance Rsub is high, the average luminance is set as the compression start level "Ys" so that the compression start level "Ys" is set lower than the compression start level "Ys" set in the case where the reflectance Rsub is low.

The above modification enables to lower the compression start level if the reflectance of the main subject image is high. This enhances the contrast in the high luminance area, thereby enhancing the contrast in the entirety of the image. The modification enables to set the compression start level at a level equal to or higher than the luminance in the main subject image area if the reflectance of the main subject image, or a spatial frequency, which will be described later, is low. This enables to prevent contrast lowering of the main subject image. As mentioned above, the compression start point setter 64 variably sets the compression start level in accordance with the reflectance of the main subject image. This modification enables to set the compression start level with high latitude, considering the reflectance of the main subject image. For instance, the compression start level is set low if the reflectance of the main subject image is high.

In the modification (G), the maximal luminance and the average luminance are selectively set as the compression start level "Ys" depending on a judgment as to whether the reflectance Rsub is smaller than the threshold value "$R\theta$". Alternatively, the compression start level "Ys" may be set in correspondence to the value (large or small) of the reflectance Rsub, without using the threshold value "$R\theta$". In the alteration, the reflectance Rsub may be handled as the high-frequency component, as described in the modification (D). Also, the condition that the reflectance Rsub is low may be handled as a condition that the spatial frequency is low.

(H) The reflectance "Rhi" is not limited to the ones obtained by the calculation methods (a) through (d) in the third embodiment, but may be any value as far as the value is appropriate to set the dynamic range compression ratio "c" that is capable of keeping the reflectance component in the high luminance area from exceeding the maximal output value "Omax".

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image processing method comprising:
    a first step of sensing light representing a subject image by an image sensing device;
    a second step of extracting, by a first component extractor, a first component having a predetermined frequency out of a photographic image obtained by the image sensing device;
    a third step of extracting, by a second component extractor, a second component having a frequency higher than the frequency of the first component out of the photographic image;
    a fourth step of compressing, by a compressor, a dynamic range of the first component extracted by the first component extractor with a predetermined compression ratio;
    a fifth step of generating, by an image generator, an image based on a compressed first component obtained by compressing the dynamic range of the first component by the compressor, and the second component extracted by the second component extractor; and a sixth step of calculating, by a compression correction coefficient calculator, a compression correction coefficient used in compressing the first component, using the second component extracted by the second component extractor, wherein the fourth step is a step of determining the compression ratio by the compressor in such a manner that the larger compression correction coefficient increases the compression ratio based on the compression correction coefficient calculated by the compression correction coefficient calculator, and compressing the dynamic range of the first component based on the determined compression ratio.

2. The image processing method according to claim 1, wherein the first component is an illumination component, the second component is a reflectance component, and the compression correction coefficient is a reflectance.

* * * * *